(12) United States Patent
Vasten et al.

(10) Patent No.: US 9,355,390 B2
(45) Date of Patent: May 31, 2016

(54) PREPAID ACCOUNT FUNDS TRANSFER APPARATUSES, METHODS AND SYSTEMS

(75) Inventors: Brett Vasten, Highlands Ranch, CO (US); Virgil Mathias, Parker, CO (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 1063 days.

(21) Appl. No.: 13/028,175

(22) Filed: Feb. 15, 2011

(65) Prior Publication Data

US 2011/0202455 A1 Aug. 18, 2011

Related U.S. Application Data

(60) Provisional application No. 61/304,594, filed on Feb. 15, 2010.

(51) Int. Cl.
  *G06Q 20/00* (2012.01)
  *G06Q 20/10* (2012.01)
  *G06Q 20/28* (2012.01)

(52) U.S. Cl.
  CPC .............. *G06Q 20/10* (2013.01); *G06Q 20/28* (2013.01)

(58) Field of Classification Search
  CPC ....... G06Q 10/00; G06Q 20/00; G06Q 30/00; G06Q 40/00
  USPC .............................................. 705/3–44, 36 R
  See application file for complete search history.

(56) References Cited

U.S. PATENT DOCUMENTS

| | | | |
|---|---|---|---|
| 6,021,397 A * | 2/2000 | Jones et al. ................. | 705/36 R |
| 6,934,528 B2 | 8/2005 | Loureiro et al. | |
| 7,156,294 B2 * | 1/2007 | Roth ......................... | G06F 7/00 235/375 |
| 7,356,505 B2 | 4/2008 | March | |
| 8,510,188 B2 * | 8/2013 | Bulawa ................ | G06Q 20/102 705/35 |
| 8,660,923 B2 * | 2/2014 | Bulawa .................. | G06Q 20/10 705/35 |
| 2001/0042785 A1 * | 11/2001 | Walker et al. ................. | 235/379 |
| 2003/0080185 A1 | 5/2003 | Werther | |
| 2003/0126015 A1 * | 7/2003 | Chan et al. ...................... | 705/14 |
| 2004/0117302 A1 * | 6/2004 | Weichert et al. ................ | 705/40 |

(Continued)

OTHER PUBLICATIONS

International Search Report and Written Opinion mailed on Apr. 19, 2011 corresponding to PCT/US11/24941.

(Continued)

*Primary Examiner* — Frantzy Poinvil
(74) *Attorney, Agent, or Firm* — Loeb & Loeb LLP

(57) ABSTRACT

The PREPAID ACCOUNT FUNDS TRANSFER APPARATUSES, METHODS AND SYSTEMS ("PAFT") transform prepaid account invitation requests via PAFT components into scheduled prepaid account transactions. In one embodiment, the PAFT obtains, from a transferor user holding a transferor prepaid account, a prepaid account invitation request specifying a transferee user and a prepaid funds transfer amount. The PAFT generates a customized prepaid account invitation for the transferee user based on the prepaid account invitation request, and provides the customized prepaid account invitation for the transferee user. Upon obtaining an invitation acceptance from the transferee user in response to the provided customized prepaid account invitation, the PAFT creates a transferee prepaid account for the transferee user, and transfers, upon creating the transferee prepaid account, the prepaid funds transfer amount of funds specified in the prepaid account invitation request from the transferor prepaid account to the created transferee prepaid account.

15 Claims, 21 Drawing Sheets

Example: Prepaid Account Funds Transfer

(56) References Cited

U.S. PATENT DOCUMENTS

| | | |
|---|---|---|
| 2006/0277143 A1 | 12/2006 | Almonte et al. |
| 2007/0208662 A1 | 9/2007 | Jeronimus et al. |
| 2008/0040261 A1 | 2/2008 | Nix et al. |
| 2010/0268645 A1* | 10/2010 | Martino et al. ................. 705/39 |
| 2010/0299195 A1* | 11/2010 | Nix et al. .................... 705/14.17 |
| 2011/0055083 A1* | 3/2011 | Grinhute ............... G06Q 20/10 705/42 |
| 2011/0137791 A1* | 6/2011 | Zabawskyj et al. ............. 705/39 |
| 2012/0116970 A1* | 5/2012 | Hagmeier ............. G06Q 20/10 705/44 |
| 2013/0054468 A1* | 2/2013 | Fuentes .................. G06Q 40/02 705/64 |
| 2014/0156512 A1* | 6/2014 | Rahman ................. G06Q 20/10 705/39 |
| 2014/0379361 A1* | 12/2014 | Mahadkar ............ G06F 19/328 705/2 |

OTHER PUBLICATIONS

Australian Patent Office "Examination Report No. 1" issued in connection with AU App. No. 2011216221 on Oct. 4, 2012 (3 pages).

* cited by examiner

Example: Prepaid Account Application Invitation (PAAI) component 300

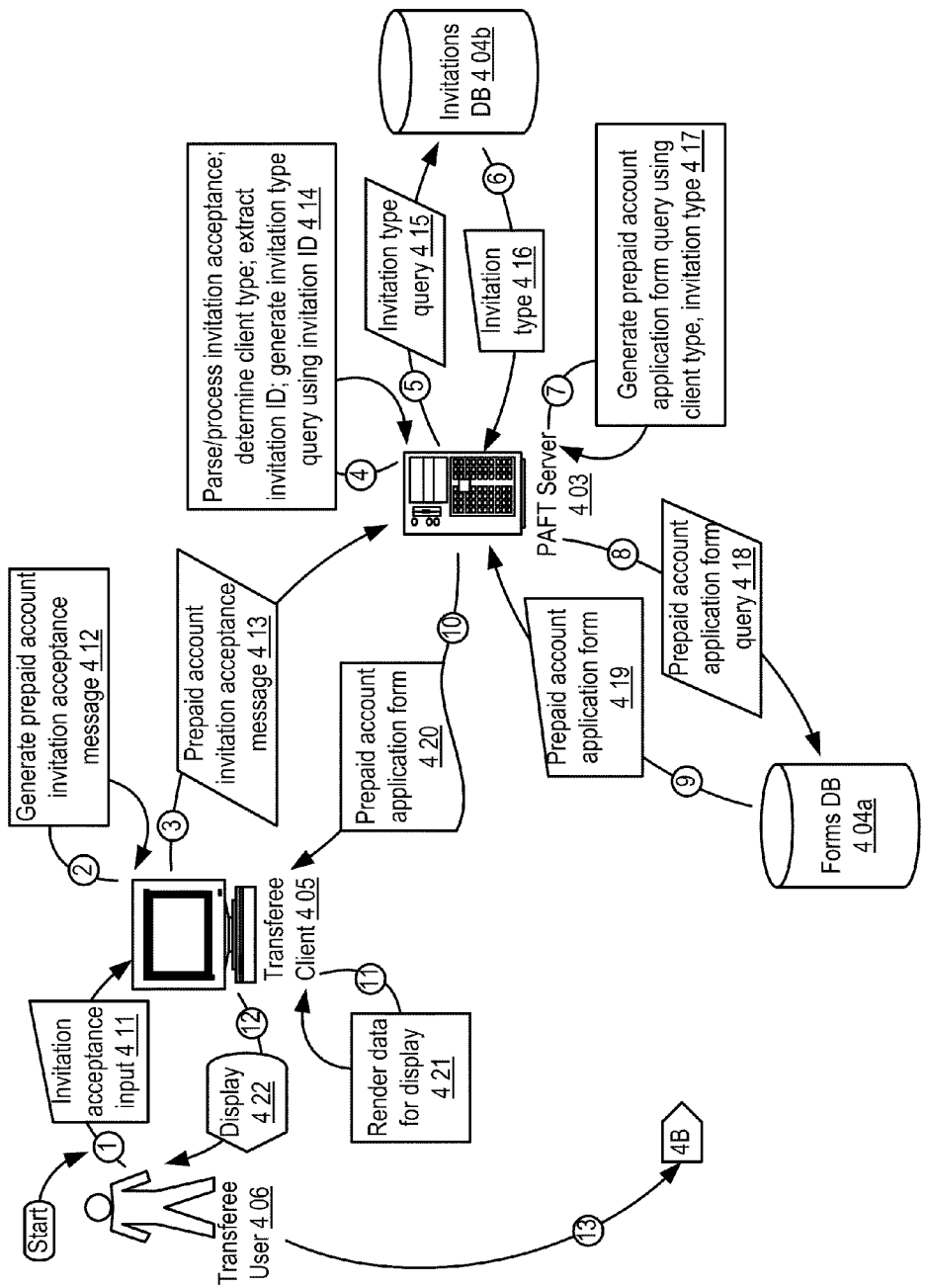
FIGURE 4A — Example: Prepaid Account Registration

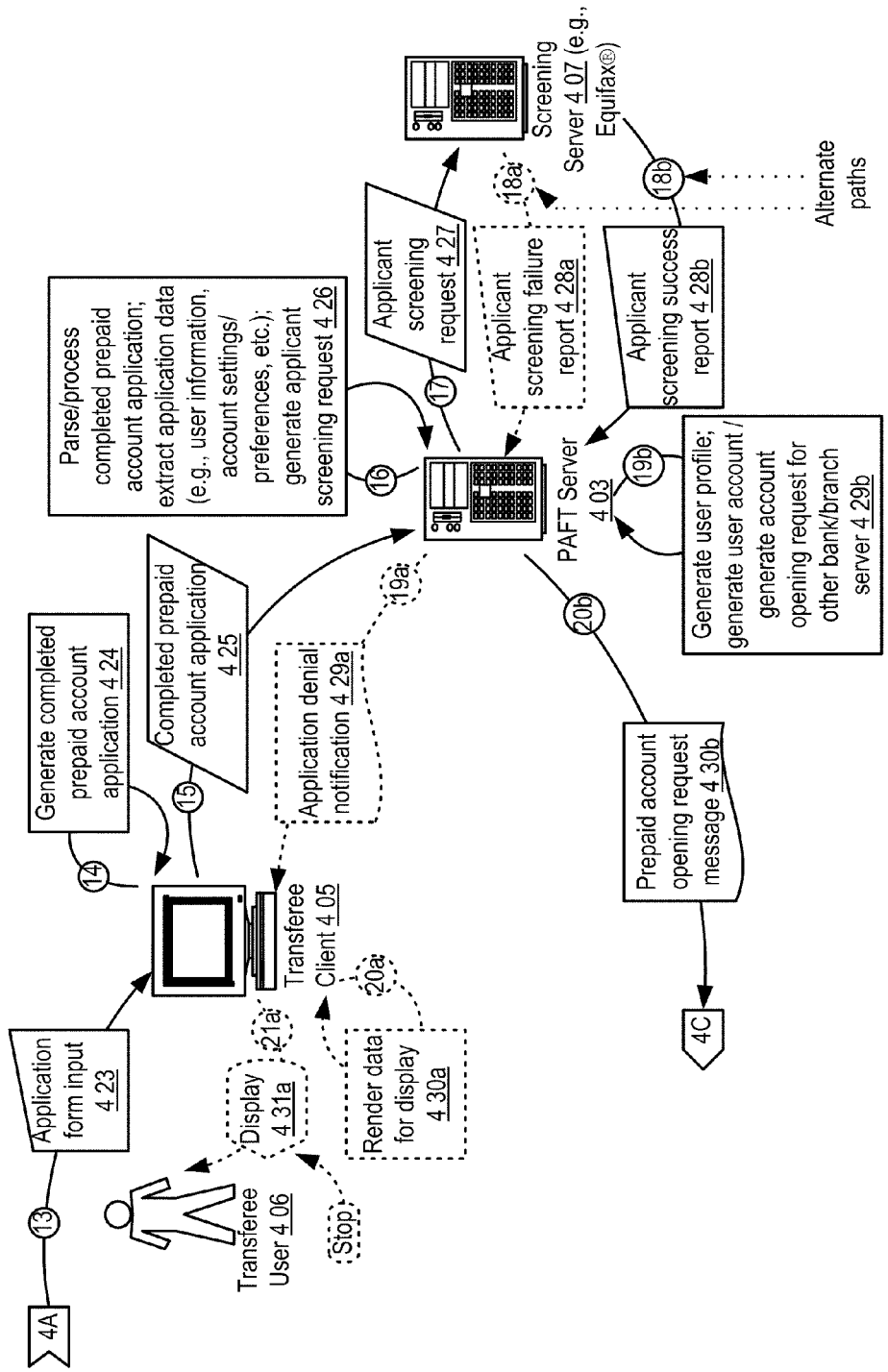
FIGURE 4B Example: Prepaid Account Registration

Example: Prepaid Account Registration (PAR) component 500

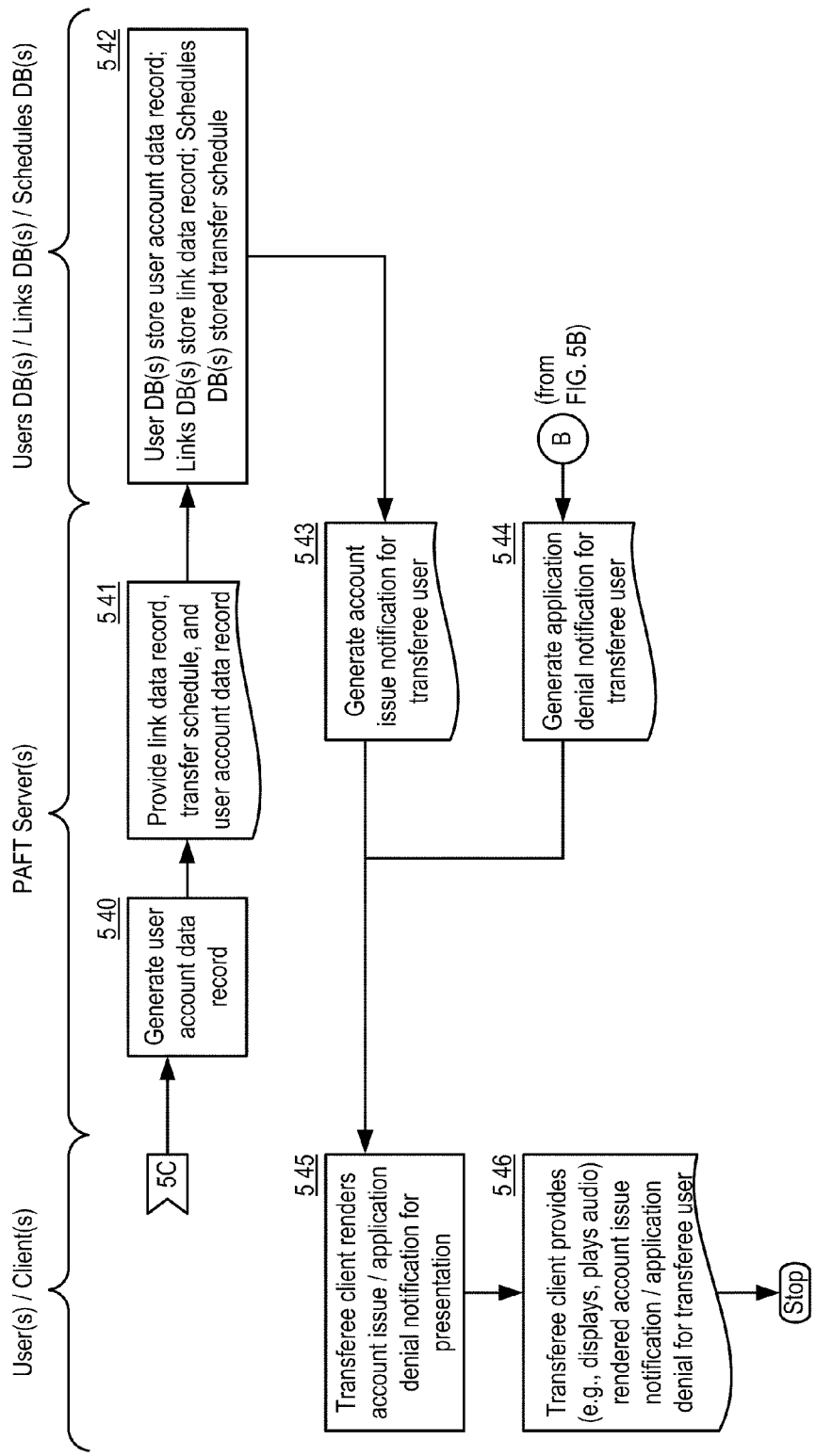
FIGURE 5D  Example: Prepaid Account Registration (PAR) component 500

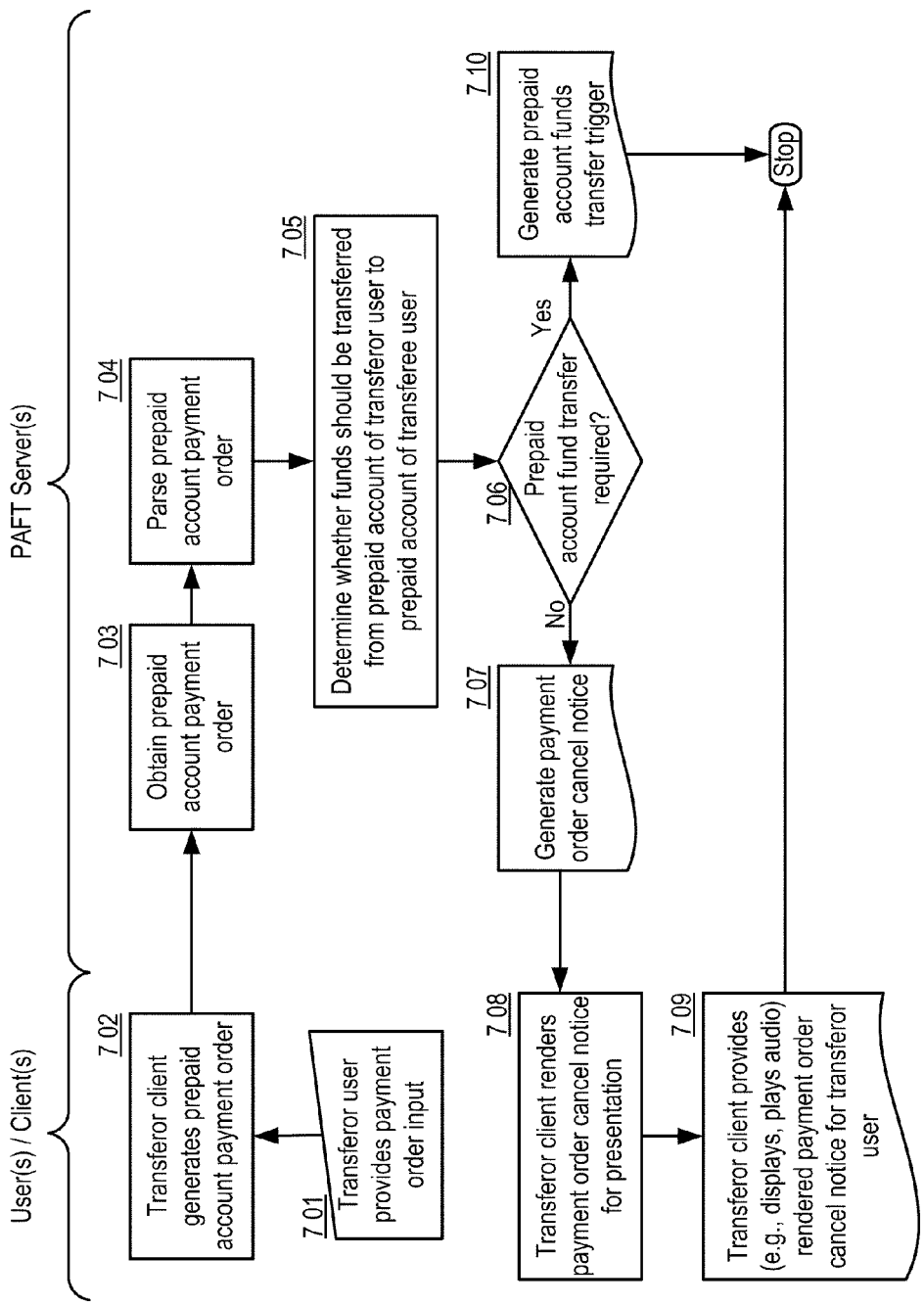
FIGURE 7   Example: Transferor-Initiated Funds Transfer Trigger (Tr-FTT) component 700

Example: Transferee-Initiated Funds Transfer Trigger (Te-FTT) component 800

Example: Prepaid Account Funds Transfer Management User Interface

PREPAID ACCOUNT FUNDS TRANSFER APPARATUSES, METHODS AND SYSTEMS

RELATED APPLICATIONS

Applicant hereby claims priority under 35 USC §119 for U.S. provisional patent application Ser. No. 61/304,594 filed Feb. 15, 2010, entitled "PREPAID ACCOUNT TRANSFEROR INVITATION FOR A TRANSFEREE LINKED PREPAID ACCOUNT;". The entire contents of the aforementioned application are herein expressly incorporated by reference.

This patent application disclosure document (hereinafter "description" and/or "descriptions") describes inventive aspects directed at various novel innovations (hereinafter "innovation," "innovations," and/or "innovation(s)") and contains material that is subject to copyright, mask work, and/or other intellectual property protection. The respective owners of such intellectual property have no objection to the facsimile reproduction of the patent disclosure document by anyone as it appears in published Patent Office file/records, but otherwise reserve all rights.

FIELD

The present inventions are directed generally to apparatuses, methods, and systems for account-based transactions, and more particularly, to PREPAID ACCOUNT FUNDS TRANSFER APPARATUSES, METHODS AND SYSTEMS ("PAFT").

BACKGROUND

Many users prefer to engage in account-based transactions, such as credit or debit transactions, because of the security and convenience they provide. Prepaid cards are particularly attractive because they provide additional advantages such as spending alerts and controls. The range of account-based transactions is currently limited in terms of the types of transactions possible, and the persons with whom such transactions may be conducted.

BRIEF DESCRIPTION OF THE DRAWINGS

The accompanying appendices and/or drawings illustrate various non-limiting, example, inventive aspects in accordance with the present disclosure:

FIGS. 4A-C show data flow diagrams illustrating an example procedure to register a new prepaid account for a user in some embodiments of the PAFT;

FIGS. 5A-D show logic flow diagrams illustrating example aspects of registering a new prepaid account for a user in some embodiments of the PAFT, e.g., a Prepaid Account Registration (PAR) component 500;

FIG. 7 shows a logic flow diagram illustrating example aspects of implementing a transferor user-initiated trigger for prepaid account funds transfer in some embodiments of the PAFT, e.g., a Transferor-Initiated Funds Transfer Trigger (Tr-FTT) component 700;

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

Prepaid Account Funds Transfer (PAFT)

The PREPAID ACCOUNT FUNDS TRANSFER APPARATUSES, METHODS AND SYSTEMS (hereinafter "PAFT") transform prepaid account invitation requests, via various PAFT components, into scheduled prepaid account transactions.

Figure 1:
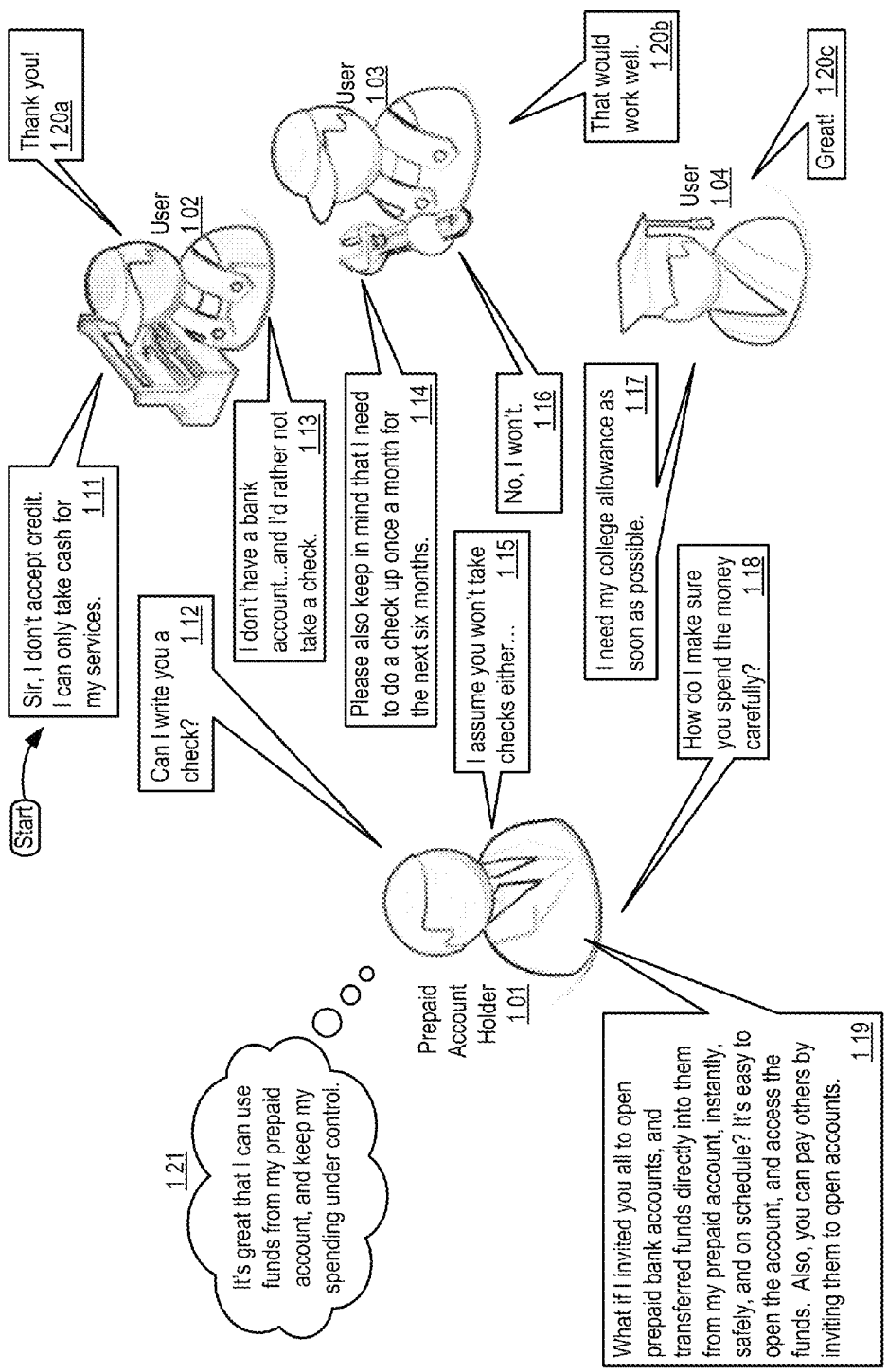
FIG. 1 shows a block diagram illustrating example aspects of prepaid account funds transfer in some embodiments of the PAFT.

FIG. 1 shows a block diagram illustrating example aspects of prepaid account funds transfer in some embodiments of the PAFT. In some implementations, a prepaid account holder, e.g., 101, may owe funds to users, e.g., 102-104. For example, the prepaid account holder may owe funds for services rendered, e.g., in the example of users 103 and 103. In some scenarios, the user to whom funds are owe may not be able to accept the funds (see, e.g., in) via account-based transactions such as credit card payment, for example, because they may not have the infrastructure to process such transactions as a merchant (e.g., gardener, repairman). The users may also be unwilling to accept the funds owed in other forms such as a check, because they may not even have a bank account, or because accepting such forms of payment may subject them to higher levels of risk (see, e.g., 112-113) that they find unacceptable, e.g., 116. In some scenarios, such users may be owed funds on, e.g., a regular, period, basis (see e.g., 114). For example, some services may require that performance be executed more than once, perhaps on a regular repeatable schedule, thus requiring payment on a regular repeatable schedule. In another example, a long schedule of payment of funds owed may be pre-determined, exacerbating the problems of transferring funds owed from the prepaid account holder to the user(s). In some scenarios, the prepaid account holder may wish to transfer funds (see, e.g., 117) to a user, e.g., 104, but may wish to exercise spending controls on the user for whom the prepaid account holder wishes to transfer funds owed (see, e.g., 118).

In some implementations, the PAFT may allow the prepaid account holder 101 to invite the users 102-104 (to whom the prepaid account holder desires to transfer funds owed), to open prepaid accounts via the PAFT. The PAFT may open prepaid accounts for such users, and may provide links between the prepaid account of the prepaid account holder 101 and the user 102-104. In some implementations, the PAFT may facilitate fast, reliable, and secure transfer of funds from the prepaid account of the prepaid account holder 101 to the prepaid accounts of the users 102-104. In some implementations, the PAFT may initiate funds transfer immediately upon opening of the prepaid accounts of the users 102-104. Thus, if the users accept the invitation of the prepaid account holder, the PAFT may, in some implementations, conduct real-time secure transfer of funds from the prepaid account holder to the users. In some implementations, the PAFT may also allow the account holders and/or users to create transfer schedules for future funds transfers. In some implementations, the PAFT may enable the users who received new accounts to similarly invite others who do not have prepaid accounts to establish new prepaid accounts with the PAFT to facilitate further funds transfers. Such prepaid account funds transfers may also allow the transferors of funds owed to exercise spending controls for themselves via their prepaid accounts.

Figure 2:
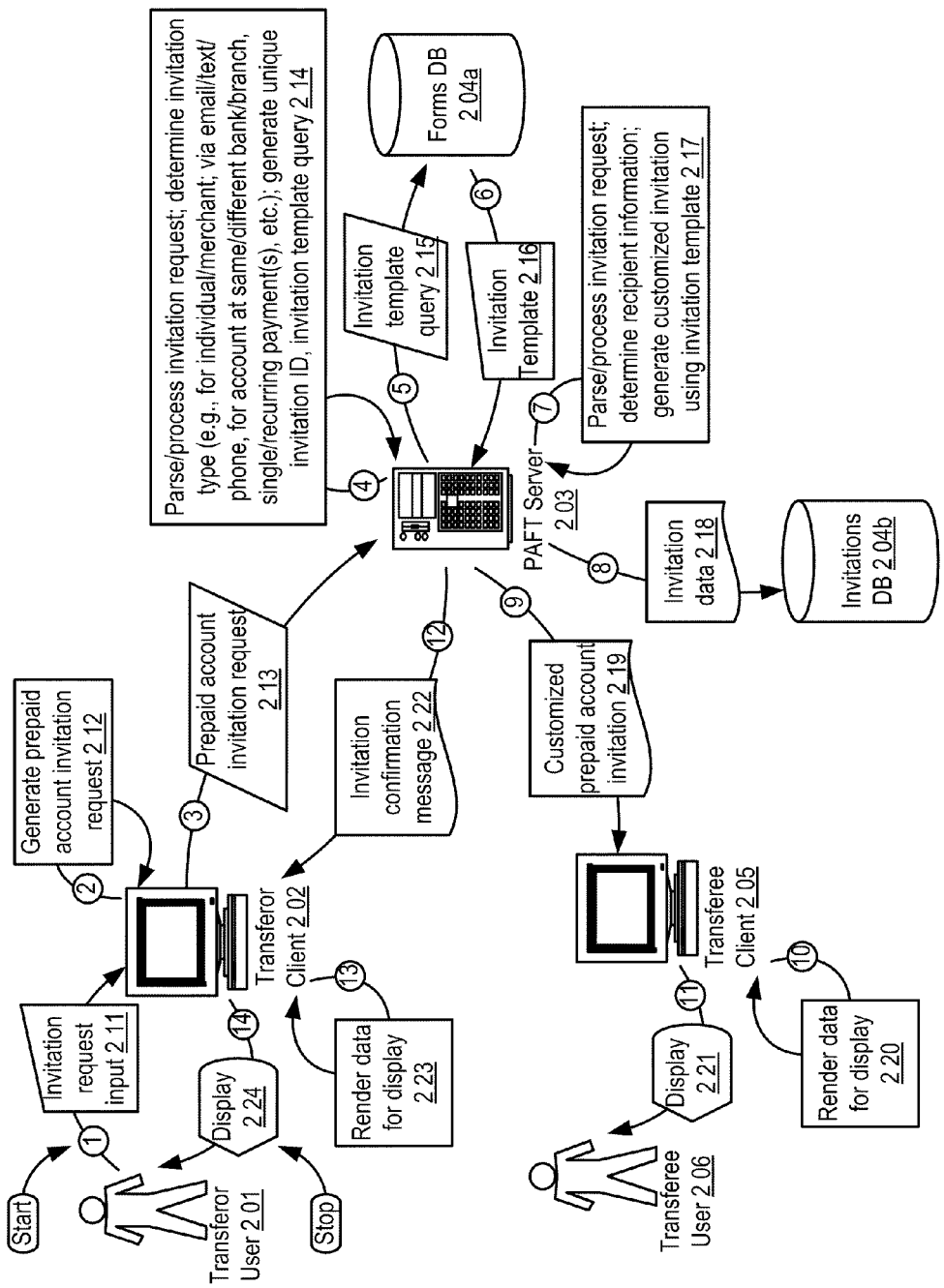
FIG. 2 shows a data flow diagram illustrating an example procedure to generate a customized invitation for a user to open a new prepaid account in some embodiments of the PAFT.

FIG. 2 shows a data flow diagram illustrating an example procedure to generate a customized invitation for a user to open a new prepaid account in some embodiments of the PAFT. In some implementations, a transferor user 201 may wish to invite a transferee user 206 to open a prepaid account for funds transfer. The transferor user may utilize a transferor client 202 communicating with a PAFT server 203 ("server") to generate a prepaid account invitation customized for the transferee user. For example, the transferor user may provide user input, e.g., invitation request input 211, into the client device. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like.

In some implementations, the user may provide invitation request input, e.g., 211, to the transferor client indicating that the user desires to invite the transferee user to apply for a prepaid account. For example, the transferor user may desire for the transferee user to open the prepaid account so that the transferor user can transfer funds to the transferee user's newly opened prepaid account. As another example, the transferor user may wish to obtain funds from the transferee user on a regular basis (e.g., according to a predetermined schedule), and may wish for the transferee user to utilize a prepaid account to provide the payments for funds transfer for risk minimization and/or security purposes.

In response to the transferor providing the invitation request input, the transferor client may generate a prepaid account invitation request, e.g., 212, and provide, e.g., 213, the generated prepaid account invitation request to the server, e.g., 203. For example, a browser application executing on the transferor client may provide, on behalf of the user, a (Secure) Hypertext Transfer Protocol ("HTTP(S)") POST message including the prepaid account invitation request details for the server in the form of data formatted according to the eXtensible Markup Language ("XML"). Below is an example HTTP(S) POST message that may be sent by a browser executing on the transferor client to provide a prepaid account invitation request to the server:

```
POST /inviterequests.php HTTP/1.1
Host: www.paft.com
Content-Type: Application/XML
Content-Length: 921
<?XML version = "1.0" encoding = "UTF-8"?>
<paft_invitation_request>
     <request_id>FBSWEUHY48</request_id>
     <timestamp>2011-02-09 09:27:13</timestamp>
     <transferor_ID>transferor@paft.com</user_ID>
     <client_IP>192.168.20.78</client_IP>
     <transferee_details>
          <transferee_type>individual</transferee_type>
          <first_name>John</first_name>
          <last_name>Public</last_name>
          <contact_type>email</contact_type>
          <contact_info>john.q.public@gmail.com</contact_info>
          <alt_contact_type>SMS</alt_contact_type>
          <alt_contact_info>415-927-4555</alt_contact_info>
          <client_type>smartphone</client_type>
     </transferee_details>
     <num_invite_attempts>3</num_invite_attempts>
     <account_params>
          <same_bank>yes</same_bank>
          <same_branch>no</same_branch>
          <persistent_link>yes</persistent_link>
     </account_params>
     <transfer_params>
          <on_schedule>no</on_schedule>
          <one_time>yes</one_time>
          <amount>$250.00</amount>
          <instant_transfer>yes</instant_transfer>
     </transfer_params>
</paft_invitation_request>
```

Upon receiving the prepaid account invitation request from the transferor client, the server 203 may parse the invitation request to extract the included invitation request data. Parsing procedures that the server may employ are outlined in the description below with reference to FIG. 12. Upon determining the parameters of the invitation request, the server may generate a unique ID associated with the invitation to be generated based on the request. In some implementations, the server may extract, based on parsing the request message, data regarding the messaging mode (e.g., SMS, email, voicemail, automated/manual phone call, postal mail, etc.) by which the transferor user desires the PAFT to provide a prepaid account invitation for the transferee user. Based on the user messaging mode preference(s), the server may generate a query, e.g., 214, for a template from a database which the server can utilize to generate a customized prepaid account invitation message for the transferee user in accordance with the messaging mode preferences of the transferor user. The server may issue the query, e.g., 215, to a database storing invitation templates, e.g., forms database 204a. For example, the server may execute a PHP script including Structured Query Language ("SQL") commands to query a relational database storing invitation templates. An example listing, written substantially in the form of PHP/SQL commands, illustrating substantive aspects of querying the database for an invitation template is provided below:

```
<?PHP
header('Content-Type: text/plain');
function invitation_template_query($template_type, $DBserver, $password) {
```

-continued

```
mysql_connect("254.92.185.102",$DBserver,$password);
// access database server
mysql_select_db("TEMPLATES.SQL"); // select database table to search
//create query for invitation template
$query = "SELECT invitation_template FROM TemplateStore WHERE
    type LIKE '%' $template_type";
$result = mysql_query($query); // perform the search query
mysql_close("TEMPLATES.SQL"); // close database access
return $result; // return search results
?>
```

In response to the invitation template query, the forms database may provide, e.g., 216, the requested invitation template to the server. In some implementations, the server may parse, e.g., 217, the invitation request to determine information of the transferee user who will be the recipient of the prepaid account invitation. Based on the recipient information of the transferee user, the server may generate a customized prepaid account invitation. For example, the customized prepaid account invitation may take the form of a text message, SMS, email, electronic communication, fax, voicemail, automated phone call, script print-out for a customer service representative to make a manual phone call, automated/manual online chat script, webpage, and/or the like. In some implementations, the server may store, e.g., 218, the generated customized invitation, unique ID, and/or other invitation data to a database, eg., invitations database 204*b*. An example listing, written substantially in the form of PHP/SQL commands, to store the invitation data to a database is provided below:

```
<?PHP
header('Content-Type: text/plain');
mysql_connect("254.92.185.103",$DBserver,$password);
// access database server
mysql_select("INVITATIONS.SQL"); // select database to append
mysql_query("INSERT INTO UserInvitationsTable (requestID,
    transferorID, transferorIP, time, uniqueID, transfereetype,
    transfereename, transfereecontacttype, transfereecontactinfo,
    altcontactinfo, transfereeclienttype, numinvites, samebank, samebranch,
    persistentlink, onschedule, onetime, amount, instanttransfer,
    custominvite)
VALUES ($request_ID, $transferor_ID, $transferor_IP, $timestamp,
    $unique_ID,
    $transferee_type, $transferee_name, $transferee_contact_type,
    $transferee_contact_info, $alt_contact_info, $transferee_client_type,
    $num_invite_attempts, $same_bank, $same_branch,
    $persistent_link,
    $on_schedule, $one_time, $amount, $instant_transfer,
    $custom_invitation)");
    // add data to table in database
mysql_close("INVITATIONS.SQL"); // close connection to database
?>
```

In some implementations, the server may provide the generated customized prepaid account invitation, e.g., 219, for a transferee client, e.g., 205, of a transferee user, e.g., 206, specified by the invitation request of the transferor user. For example, the server may send an electronic mail message to an electronic mail messaging account of the transferee user. An example listing, written substantially in the form of PHP/SQL commands, for the server to send an electronic mail message to an electronic mail messaging account of the transferee user is provided below:

```
<?PHP
header('Content-Type: text/plain');
// customized invitation is stored in data variable $message, and transferor
    user name is stored in $transferor
$to = 'john.q.public@gmail.com';
$subject = 'Prepaid Account Invitation from ' . $transferor;
$headers = 'From: invitations@paft.com' . "\r\n" .
    'Reply-To: invitations@paft.com' . "\r\n" .
    'X-Mailer: PHP/' . phpversion( );
mail($to, $subject, $message, $headers);
?>
```

In some implementations, the transferee client may render, e.g., 220, the customized prepaid account invitation for presentation to the transferee user. For example, the transferee client may render a webpage, electronic message, text/SMS message, buffer a voicemail, emit a ring tone for the transferee user to answer a phone and/or play an audio message, etc. The transferee client may then present the customized prepaid account invitation for the transferee user, e.g., 221. For example, the transferee client may provide output including, but not limited to: sounds, music, audio, video, images, tactile feedback, vibration alerts (e.g., on vibration-capable client devices such as a smartphone etc.), and/or the like. In some implementations, the server may also provide an invitation confirmation message, e.g., 222, for the transferor client of the transferor user. For example, the server may send an electronic mail message to an electronic mail messaging account of the transferor user. The transferor client may render, e.g., 223, the customized prepaid account invitation for presentation to the transferor user. For example, the transferee client may render a webpage, electronic message, text/SMS message, buffer a voicemail, emit a ring tone for the transferee user to answer a phone and/or play an audio message, etc. The transferor client may then present the customized prepaid account invitation for the transferor user, e.g., 224. For example, the transferor client may provide output including, but not limited to: sounds, music, audio, video, images, tactile feedback, vibration alerts (e.g., on vibration-capable client devices such as a smartphone etc.), and/or the like.

Figure 3A:
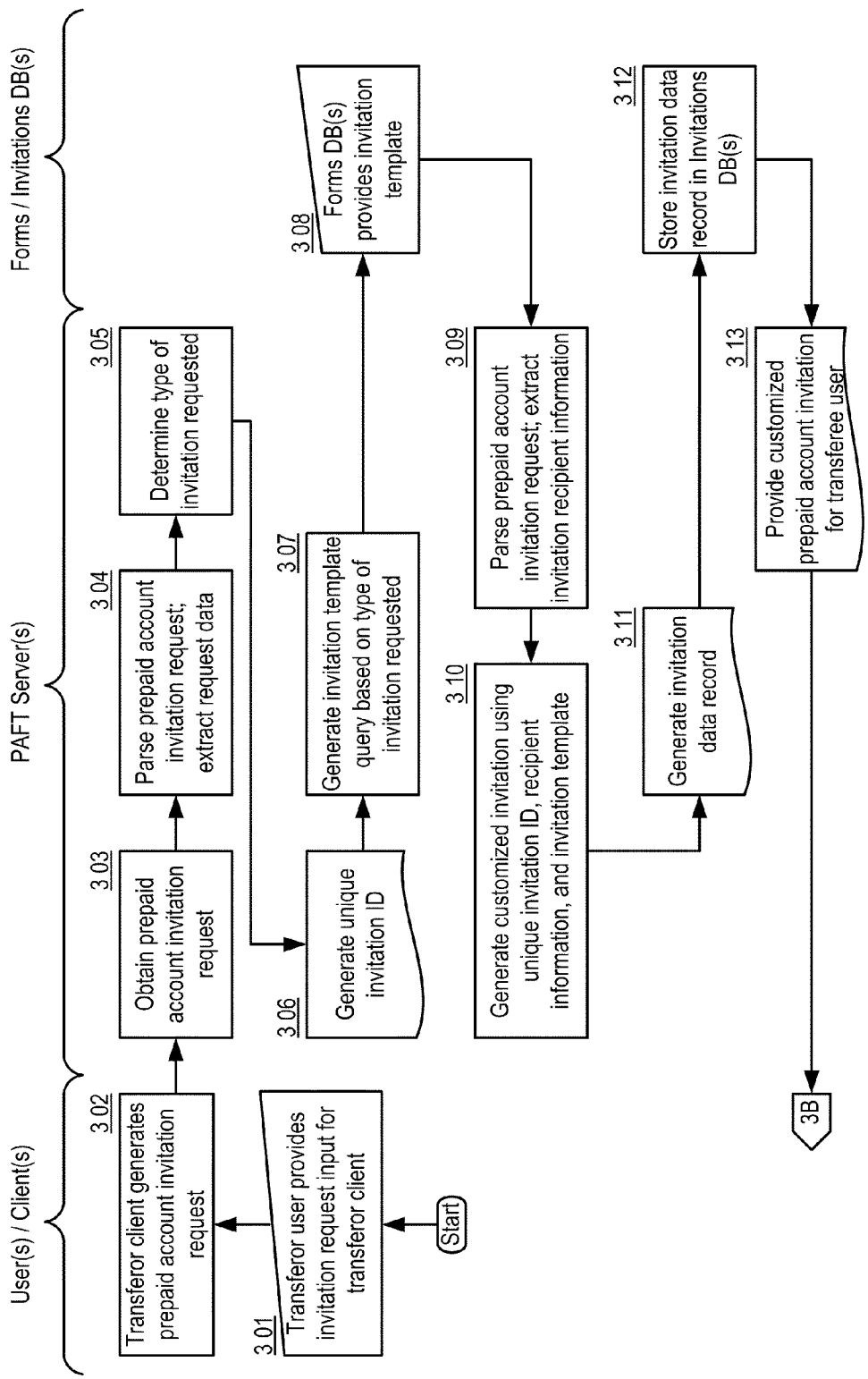
FIGS. 3A-B show logic flow diagrams illustrating example aspects of generating a customized invitation for a user to open a new prepaid account in some embodiments of the PAFT, e.g., a Prepaid Account Application Invitation (PAAI) component 300.
Figure 3B:
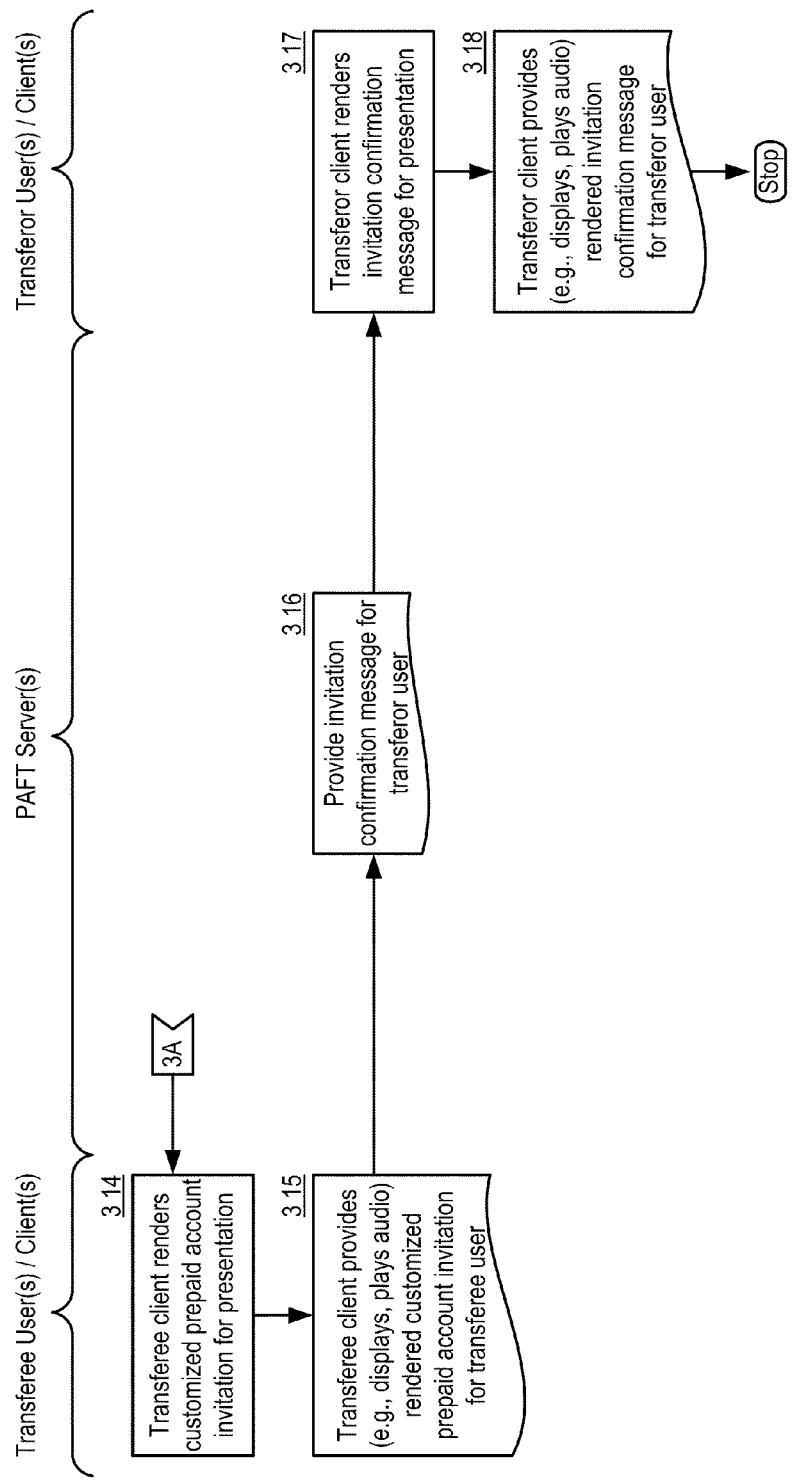

FIGS. 3A-B show logic flow diagrams illustrating example aspects of generating a customized invitation for a user to open a new prepaid account in some embodiments of the PAFT, e.g., a Prepaid Account Application Invitation (PAAI) component 300. In some implementations, a transferor user may invite a transferee user to open a prepaid account for funds transfer. For example, the transferor user may provide invitation request input, e.g. 301, into the transferor client. In some implementations, the user provided invitation request input may indicate to the transferor client that the user desires to invite the transferee user to apply for a prepaid account. For example, the transferor user may desire for the transferee user to open the prepaid account so that the transferor user can transfer funds to the transferee user's newly opened prepaid account. As another example, the transferor user may wish to obtain funds from the transferee user on a regular basis (e.g., according to a predetermined schedule), and may wish for the transferee user to utilize a prepaid account to provide the payments for funds transfer for risk minimization and/or security purposes. In response to the transferor providing the invitation request input, the transferor client may generate a prepaid account invitation request, e.g., 302, and provide the generated prepaid account invitation request to the PAFT server.

Upon obtaining, e.g., 303, the prepaid account invitation request from the transferor client, the server may parse the invitation request to extract the included invitation request data, e.g., 304. Parsing procedures that the server may employ are outlined in the description below with reference to FIG. 12. Based on the parsing, the server may extract data fields including, but not limited to: request_id, timestamp, transferor_id, client_IP, transferee_details_list, transferee_type, first_name, last_name, contact_type, contact_info, alt_contact_info, alt_contact_type, alt_contact_info, client_type, num_invite_attempts, account_params_list, same_bank_flag, same_branch_flag, persistent_link_flag, transfer_param_list, on_schedule_flag, one_time_flag, amount, instant_transfer_flag, custom_invitation, transferee_details_list, transferee_client_IP, and/or the like. Upon determining the parameters of the invitation request, the server may generate a unique ID associated with the invitation to be generated based on the request, e.g., 306. For example, the server may execute a hypertext preprocess ("PHP") script which invokes the md5( ) command to generate a hash of the invitation request message, and utilize the generated message hash as the unique invitation ID. As another example, the server may utilize the rand( ) command to generate a random number to be utilized as the unique invitation ID. In some implementations, the server may extract, based on parsing the request message, data regarding the messaging mode (e.g., SMS, email, voicemail, automated/manual phone call, postal mail, etc.) by which the transferor user desires the PAFT to provide a prepaid account invitation for the transferee user. Based on the user messaging mode preference(s), the server may generate a query, e.g., 307, for a template from a database which the server can utilize to generate a customized prepaid account invitation message for the transferee user in accordance with the messaging mode preferences of the transferor user. The server may issue the query to a database storing invitation templates, e.g., a forms database. In response to the invitation template query, the forms database may provide, e.g., 308, the invitation template to the server.

In some implementations, the server may parse, e.g., 309, the invitation request to determine information of the transferee user who will be the recipient of the prepaid account invitation. For example, the server may extract data field such as, but not limited to: transferee_ID, transferee_type, first_name, last_name, contact_type, contact_info, alt_contact_info, alt_contact_type, alt_contact_info, client_type, and/or the like. Based on the recipient information of the transferee user, the server may generate, e.g., 310, a customized prepaid account invitation. For example, the customized prepaid account invitation may take the form of a text message, SMS, email, electronic communication, fax, voicemail, automated phone call, script print-out for a customer service representative to make a manual phone call, automated/manual online chat script, webpage, and/or the like. In some implementations, the server may generate, e.g., 311, a customized invitation data record including the data fields, unique ID, customized invitation, and/or other invitation data, and provide the invitation data record to a database, e.g., invitations database for storing the invitation data, e.g., 312. In some implementations, the server may provide the generated customized prepaid account invitation, e.g., 313, for a transferee client of a transferee user specified by the invitation request of the transferor user. In some implementations, the transferee client may render, e.g., 314, the customized prepaid account invitation for presentation to the transferee user. The transferee client may then present the customized prepaid account invitation for the transferee user, e.g., 315. In some implementations, the server may also provide an invitation confirmation message, e.g., 316, for the transferor client of the transferor user. The transferor client may render, e.g., 317, the customized prepaid account invitation for presentation to the transferor user. The transferor client may then present the customized prepaid account invitation for the transferor user, e.g., 318.

Figure 4C:
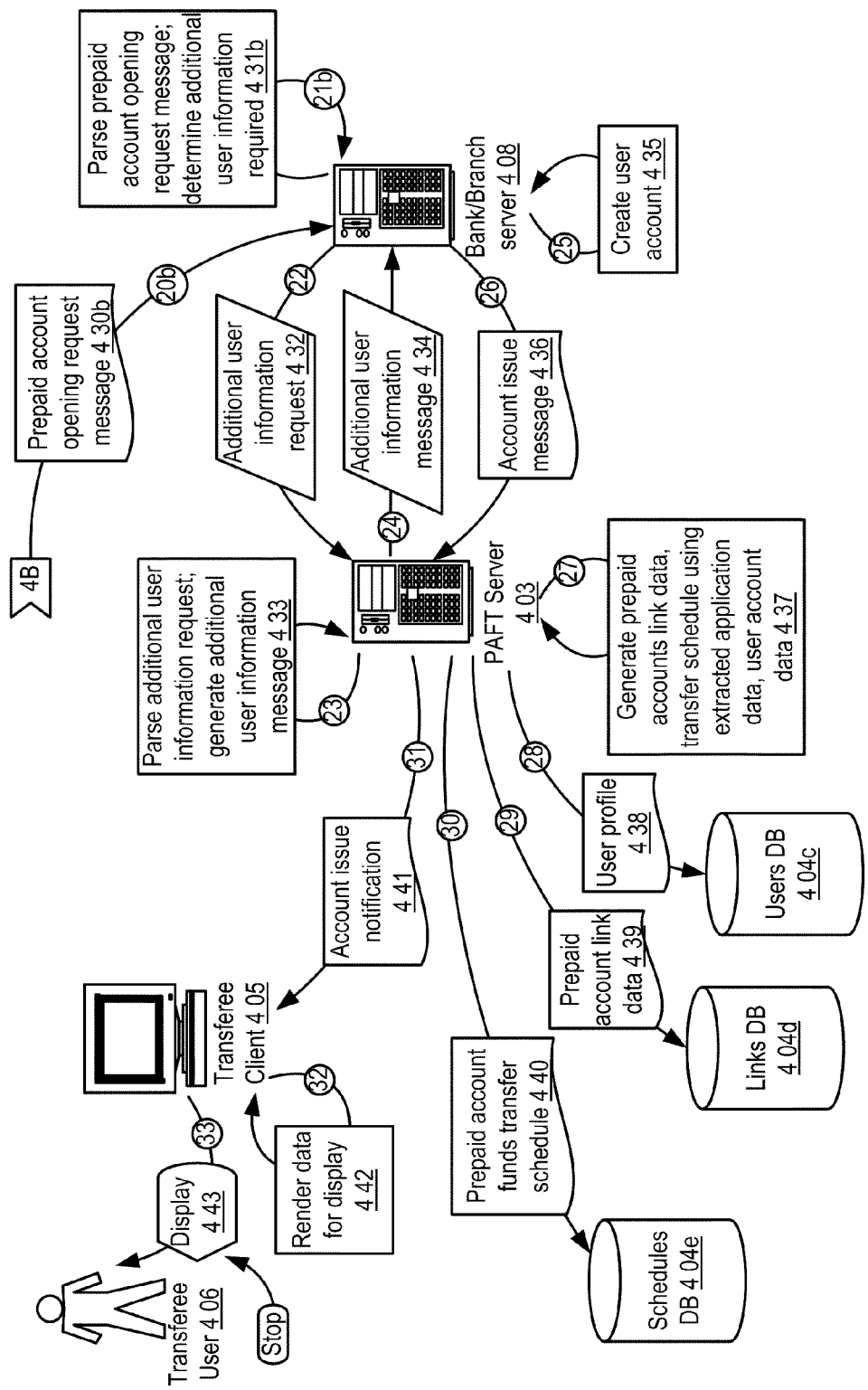
Figure 5A:
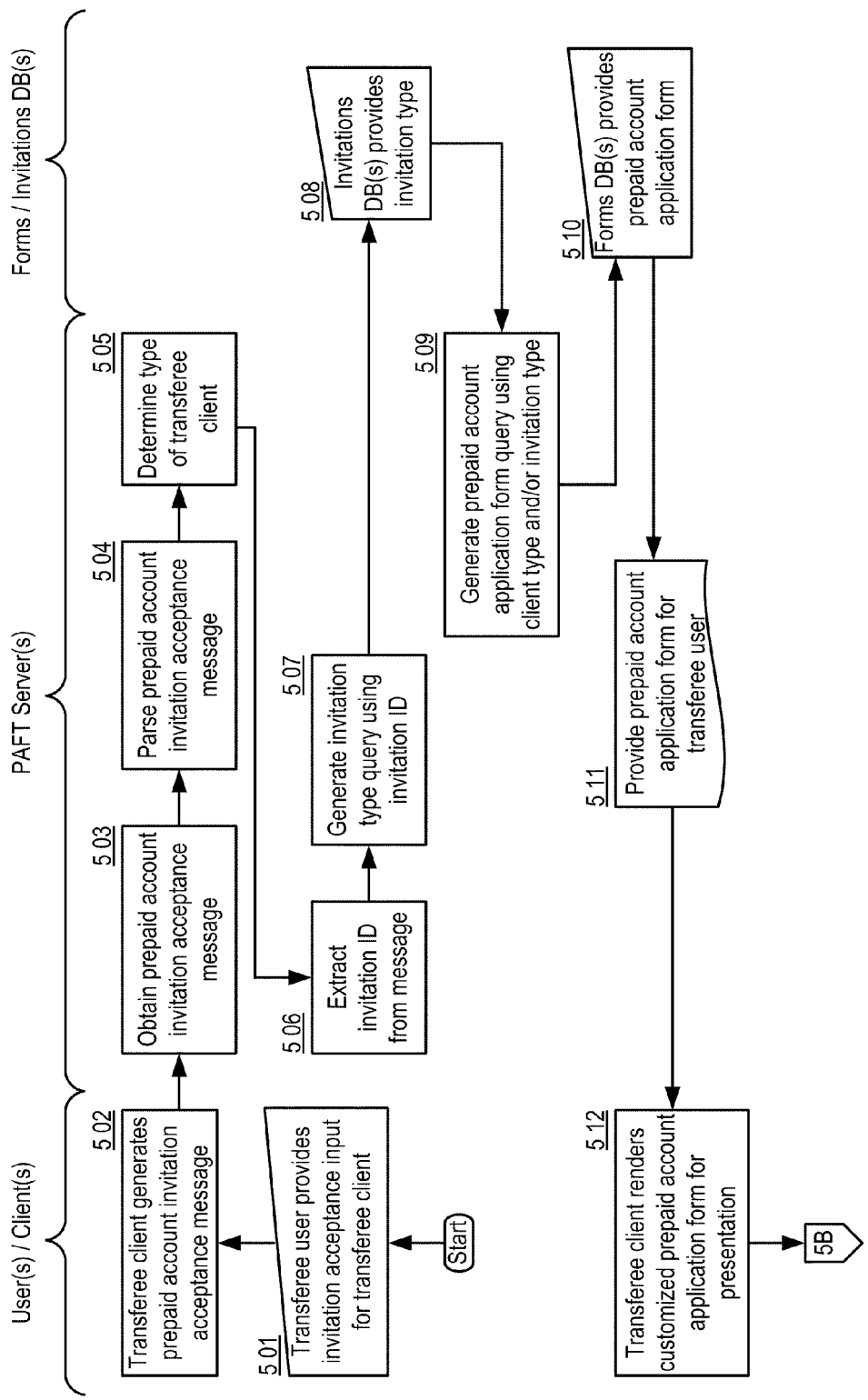
Figure 5B:
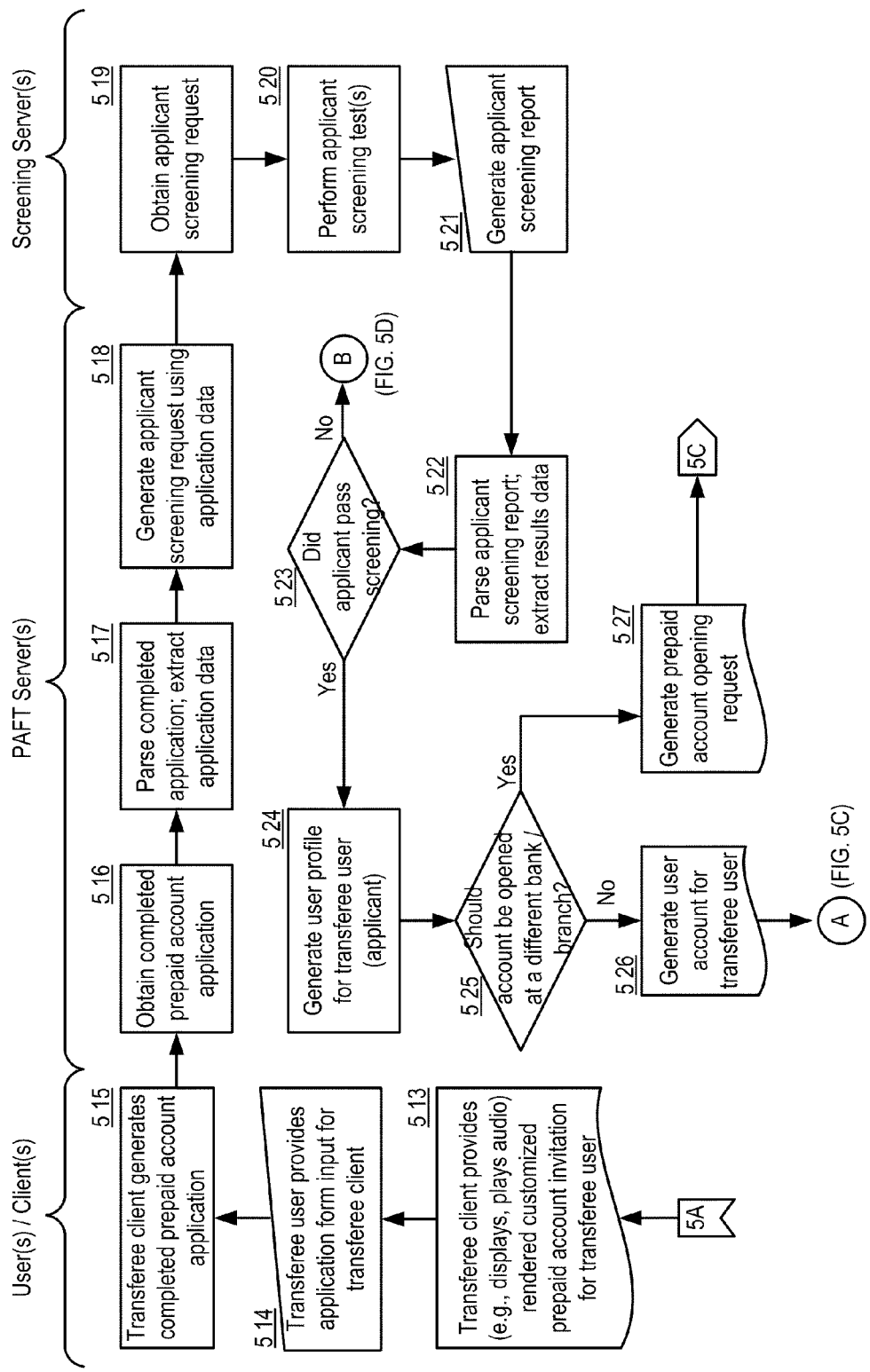
Figure 5C:
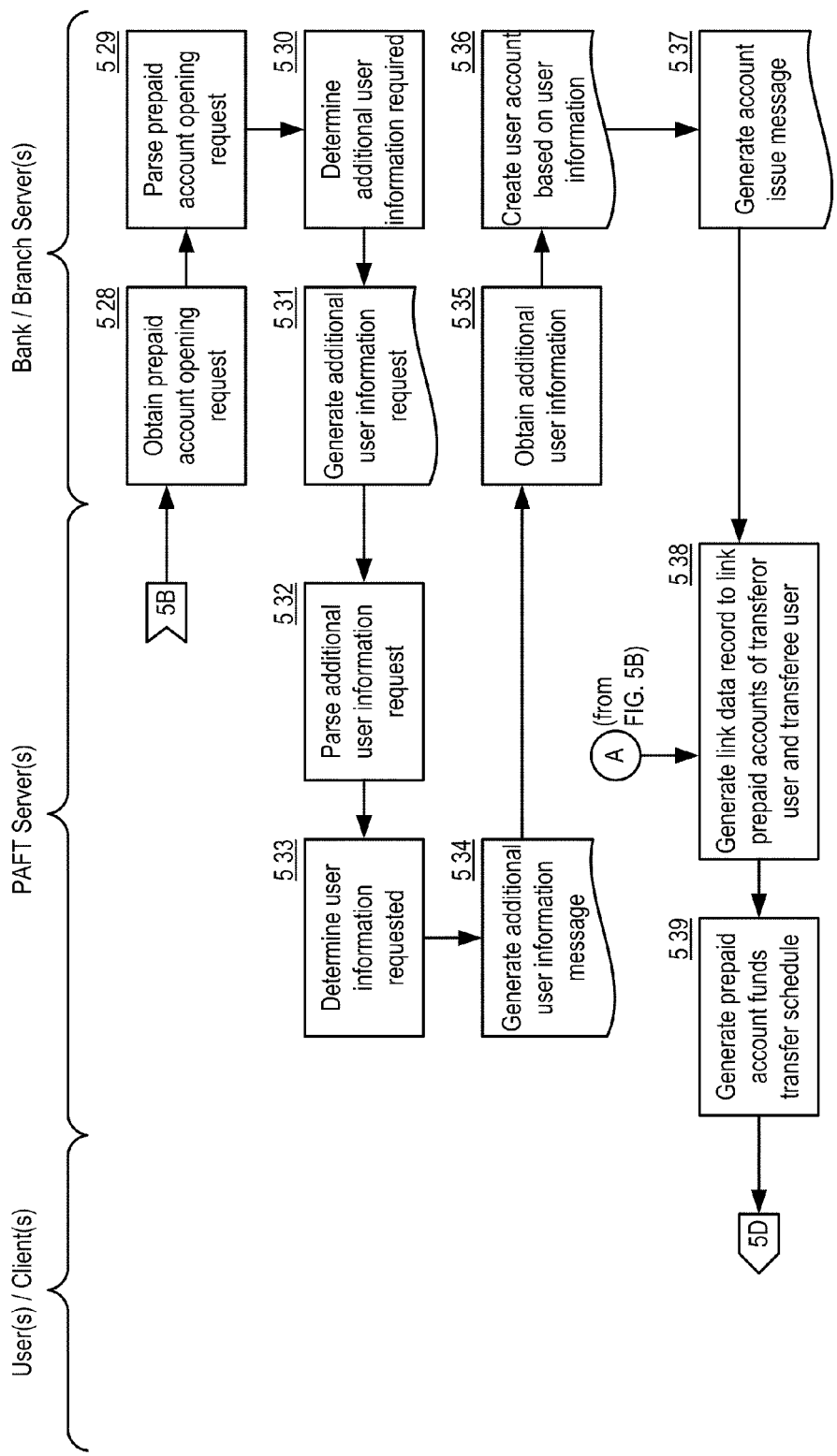

FIGS. 4A-C show data flow diagrams illustrating an example procedure to register a new prepaid account for a user in some embodiments of the PAFT. In some implementations, the transferee user may desire to accept the invitation offer by the server to open a prepaid account with the PAFT. For example, the transferee user 406 may provide invitation acceptance input, e.g., 411, to the transferee client to convey acceptance of the invitation. In various implementations, the user input may include, but not be limited to: keyboard entry, mouse clicks, depressing buttons on a joystick/game console, voice commands, single/multi-touch gestures on a touch-sensitive interface, touching user interface elements on a touch-sensitive display, and/or the like. For example, the transferee user may activate a hyperlink in an email message sent by the server to the transferee user including a customized prepaid account invitation. Activating the hyperlink may serve as the signal for the transferee client that the transferee user wishes to accept the customized prepaid account invitation. In response to the transferee user input, the transferee client may generate a prepaid account invitation acceptance message, e.g., 412 for the server. For example, a browser executing on the transferee client may generate a HTTP(S) GET message including the prepaid account invitation acceptance message. An example HTTP(S) GET message that may be sent by a browser executing on the transferee client to provide a prepaid account invitation acceptance message to the server is provided below:

```
GET /inviteaccept.php HTTP/1.1
Host: www.paft.com
Content-Type: Application/XML
Content-Length: 894
<?XML version = "1.0" encoding = "UTF-8"?>
<paft_invitation_accept>
    <invitation_id>VBUQQW9M,</invitation_id>
    <accept_timestamp>2011-02-10 08:27:13</accept_timestamp>
    <transferor_ID>transferor@paft.com</user_ID>
    <transferee_details>
        <transferee_type>individual</transferee_type>
        <first_name>John</first_name>
        <last_name>Public</last_name>
        <contact_type>email</contact_type>
        <contact_info>john.q.public@gmail.com</contact_info>
        <alt_contact_type>SMS</alt_contact_type>
        <alt_contact_info>415-927-4555</alt_contact_info>
        <client_type>smartphone</client_type>
    </transferee_details>
    <client_IP>192.168.20.67</client_IP>
    <account_params>
        <same_bank>yes</same_bank>
        <same_branch>no</same_branch>
        <persistent_link>yes</persistent_link>
    </account_params>
    <transfer_params>
        <on_schedule>no</on_schedule>
        <one_time>yes</one_time>
        <amount>$250.00</amount>
        <instant_transfer>yes</instant_transfer>
    </transfer_params>
</paft_invitation_accept>
```

Upon receiving the prepaid account invitation acceptance message from the transferee client, the server 403 may parse the invitation acceptance to extract the included invitation acceptance data, e.g., 414. For example, the server may extract the unique invitation ID of the invitation which the transferee user has accepted. Based on the extracted invitation data, the server may, in some implementations, determine the type of invitation to which the transferee user has response with acceptance and a client type of the transferee user. In alternate implementations, the server may use the extracted invitation data, e.g., the unique invitation ID, to query, e.g., 415, a database, e.g., invitations database 404b, for the type of the invitation. For example, the server may obtain the invitation type from the database by issuing PHP/SQL commands similar to those described above with reference to FIG. 2. In response, the database may provide the invitation type, e.g., 416, for the server.

In some implementations, the server may generate a query for a prepaid account application form using the invitation type and client type of the transferee user. For example, various transferee users and/or client may require and/or prefer different types of prepaid account application forms. For example, a prepaid account application form may be provided as a (Dynamic) HyperText Markup Language ("HTML") page, interactive Adobe® Flash object, iPhone® app, Android™ app, interactive voice application, etc. Also, the size, resolution, fidelity and/or like attributes of the prepaid account application form may be customized depending on the screen size, pixel count, audio/video processing capabilities and/or like attributes and/or preferences of the transferee client and/or transferee user. Thus, the server may generate a query for a prepaid application form that is customized to the transferee client and/or transferee user, and issue the query, e.g., 418, to a database, e.g., forms database 404a. In response to the prepaid account application form query, the database may provide a prepaid account application form, e.g., 419, that is customized to the attributes and/or preferences of the transferee client and/or transferee user. The server may provide the obtained prepaid account application form, e.g., 420, to the transferee client. For example, the server may provide the transferee client with a HTML page including a reference to an Adobe® Flash object stored on the server including the prepaid account application. An example HTML code listing including JavaScript™ commands referencing an Adobe® Flash object within the HTML page is provided below:

```
<html>
<div id="PAFT">
  If you're seeing this, you don't have Flash Player installed.
</div>
<script type="text/javascript">
  var app = new SWFObject("www.paft.com/prepaid_app.swf",
    "Media", "640", "480", "8", "#000000");
  app.addParam("quality", "high");
  app.write("PAFT");
</script>
</html>
```

Upon obtaining the prepaid account application, the transferee client may execute the prepaid account application for presentation to the user, e.g., 422. For example, with reference to the examples above, a web browser executing on the transferee client device may render, e.g., 421, the HTML web page and may communicate with the server to download the Adobe® Flash object. An Adobe® Flash browser plug-in installed on the transferee client and operating in conjunction with the browser may play/execute the downloaded Flash object for presentation, e.g., 422, to the transferee user.

In some implementations, the transferee user may provide application form input, e.g., 423, to the transferee client. For example, with reference to the example above, the Adobe® Flash object including the prepaid account application may provide interactive features, and may allow the user to enter user input/feedback, e.g. 423, via a variety of mechanisms (e.g., keyboard entry into a command-line interface, mouse input in a graphical user interface, gestures on a touch-sensitive interface, voice commands, etc.). Using the user application form input, the client may generate, e.g., 424, a completed prepaid account application. For example, the transferee client executing the Adobe® Flash object may generate, maintain, update and/or store data pertaining to the user's interaction with the Adobe® Flash object (e.g., an application state, an application data structure, a block of memory with data variables, etc.). For example, the Adobe® Flash object may store a prepaid account application data structure encoded according to the JavaScript Object Notation ("JSON") format. An example JSON-encoded prepaid account application data structure is provided below:

```
"prepaid_account_application_data"
{
"timestamp": "2010-06-30 09:23:47",
"application_id": "A236269",
"md5_auth": "f585e3efede0c3b400b25908f8fa3f6d",
"applicant_details":     {
              "applicant_id": "jqpublic",
              "applicant_name": "John Q. Public",
              "dob": "1976-02-15",
              "ssn": "123-45-6789",
              "credit_check_ok": "yes",
              "address_firstline": "123 Green Blvd.",
              "address_secondline": "Apt 58",
              "zipcode": "98765",
              "City": "Terrace Heights",
              "State": "CA"
              },
"account_params":     {
              "account_mode": "prepaid",
              "account_type": "debit",
              "account_expiry": "none",
              "bank_name": "Chasey Bank",
              "bank_branch": "auto-assign"
              }
}
```

In some implementations, the server may generate a secure communications session with the transferee client in order to facilitate communication during the prepaid account application procedure between the transferee client and server. As an example, the prepaid account application may provide data stored on the transferee client for the server as prepaid account application data, e.g., completed prepaid account application 425. For example, an Adobe® Flash object running on the transferee client may include ActionScript™ 3.0 commands to create a Secure Sockets Layer ("SSL") connection with a server, generate a message including a JSON-encoded data structure such as illustrated in the example above, and send the message via the secure SSL connection to the server. Example commands, written substantially in the form of ActionScript™ 3.0, to create a secure SSL connection to a server, load prepaid account application data from a locally stored JSON-encoded data file, and send a message including the JSON-encoded data via the SSL connection to the server, are provided below:

```
// import required packages
import flash.events.*;
import flash.net.socket;
import flash.net.URLLoader;
import flash.net.URLRequest;
import com.adobe.serialization.json.*;
// obtain server socket policy file, create socket connection to server port
system.security.loadPolicyFile("xmlsocket://www.aliserver.com:208");
msg = new socket( );
```

```
msg.connect("https://www.paft.com", 255);
// load data as text string from .json file
var loader:URLLoader = new URLLoader( );
var request:URLRequst = new URLRequest( );
request.URL = "application_data.json";
loader.dataformat = "text"
loader.load(request)
// transmit data to server via secure SSL connection, then close socket
msg.writeMultiByte(loader.data, "UTF-8");
msg.close( );
```

In some implementations, the server may be executing a PHP script implementing a SSL socket server which listens to incoming communications on a server port to which the transferee client may send data, e.g., prepaid account application 425, encoded according to the JSON format. Upon identifying an incoming communication, the PHP script may read the incoming data from the transferee client into a memory variable which can then be operated upon by the transferee client. An example listing, written substantially in the form of PHP/SQL commands, to accept JSON-encoded prepaid account application data from a transferee client via a SSL connection is provided below:

```
<?PHP
header('Content-Type: text/plain');
// set ip address and port to listen to for incoming data
$address = '192.168.0.100';
$port = 255;
// create a server-side SSL socket, listen for/accept incoming communication
$sock = socket_create(AF_INET, SOCK_STREAM, 0);
socket_bind($sock, $address, $port) or die('Could not bind to address');
socket_listen($sock);
$client = socket_accept($sock);
// read input data from client in 1024 byte blocks until end of message
do {
    $input = "";
    $input = socket_read($client, 1024);
    $data .= $input;
} while($input != "");
?>
```

In some implementations, the server may parse the obtained completed prepaid account application form from the transferee client, and extract the application data from the completed prepaid account application form. Based on the application data, the server may generate an application screening request, e.g., 426. In some implementations, the server may generate a request to perform a security and/or credit check on the applicant. For example, the server may generate an applicant screening request, e.g., 427, for a credit check service such as Equifax®. In such an example, the server may provide a HTTP(S) POST message to a screening server, e.g., 407, including applicant details extracted from the completed prepaid account application. An example HTTP(S) POST message including an applicant screening request that may be sent by the PAFT server to a screening server is provided below:

```
POST /screenresults.php HTTP/1.1
Host: www.paft.com
Content-Type: Application/XML
Content-Length: 1151
<?XML version = "1.0" encoding = "UTF-8"?>
<response>
    <response_header>
        <client_reference>A236269</client_reference>
    </response_header>
```

```
POST /applicantscreen.php HTTP/1.1
Host: www.screeningserver.com
Content-Type: Application/XML
Content-Length: 1151
<?XML version = "1.0" encoding = "UTF-8"?>
<request>
    <request_header interface_version_no="1.0" dtd_version_no="1.0">
        <client_reference>A236269</client_reference>
    </request_header>
    <service_request id="201102091121">
    <consumer_bureau_service>
    <consumer_bureau_request domain="*" usercode="*" password="***" operator_id="0000-0044">
    <consumer_search search_type="SE" opt_in_out_flag="I" associate_jointapp_flag="">
    <scoring qcb_option="1" same_company_insight="">
        <score_product code="RNISF02"/>
    </scoring >
    <data_types>
        <data_type id="ADO" maximum="00" />
        <data_type maximum="00" />
        <data_type id="CJR" maximum="00" />
        <data_type maximum="00" />
        <data_type maximum="00" />
        <data_type maximum="00" />
        <data_type maximum="00" />
        <data_type maximum="00" />
        <data_type maximum="00" />
    </data_types>
    <display_requirements applicant_data="Y" associate_data="Y" attributable_data="N" potential_associate_data="N" family_data="N" />
    <applicant_details title="" forename="John" second_name="Q." surname="Public">
    <address_details time_at_address="" address_match_flag="" address="123 Green Blvd. Apt 58, Terrace Heights CA 98765">
    </address_details>
    </applicant_details>
    </consumer_search>
    </consumer_bureau_request>
    </consumer_bureau_service>
    </service_request>
</request>
```

Upon receiving the applicant screening request, the screening server may process the applicant screening request, and may generate an applicant screening report. For example, the screening server may determine that the applicant fails the screening tests for obtaining a prepaid account with the PAFT. In such an example, the screening server may provide an applicant screening failure report, e.g., 428a. If the screening server determines that the applicant passed the screening tests for obtaining a prepaid account with the PAFT, the screening server may respond to the applicant screening request with an applicant screening success report, e.g., 428b. For example, the screening server may provide a HTTP(S) POST message to a PAFT server including an applicant screening report indicating success or failure on the part of the applicant to pass the screening tests. An example HTTP(S) POST message including an applicant screening report is provided below:

-continued

```
<service_response id="201102091121" success_flag="1">
<consumer_bureau_service>
<consumer_bureau_response>
<header error_code="00" error_message="" reference=""/>
<non_address>
        <supplied_address id="ADS" sequence_number="1" noc_indicator="N"/>
        <score id="SCO" label="RNISF02" sign="+" score="528"/>
</non_address>
<address_details sequence_number="1" match_indicator="L">
<address_matched id="ADO" address_key="58150004076" house_name=""
house_number="123" street_1="GREEN BLVD" street_2="Apt 58" district=""
posttown="TERRACE HEIGHTS" county="LOS LOBOS" postcode="98765"
address_type="HOME"/>
<electoral_roll id="ELR" name_match_indicator="A" title="" forename="John"
second_name="Q" surname="Public" date_of_birth="" period="07-10"
junior_senior=""/>
<insight id="INR" name_match_indicator="C" title="MR." forename="John"
second_name="Q" surname="PUBLIC" date_of_birth="YYYY-MM-DD"
company_class="FN" account_type="03" account_number="" start_date="2005-03-
01" end_date="2006-11-12" update_date="2011-02-09" credit_limit="0"
current_balance_sign="+" current_balance="0" start_balance="0"
default_balance="0" credit_terms="275" repayment_period="300"
payment_frequency="M" payment_history="S" delinquent_date=""
client_number="" quality_flags="" quality_indicator_1=""
quality_indicator_2="" credit_card_payment_amount_sign=""
credit_card_payment_amount="" credit_card_previous_statement_balance_sign=""
credit_card_previous_statement_balance="" credit_card_cash_advance_value=""
credit_card_cash_advance_count="" credit_card_limit_change_flag=""
credit_card_minimum_payment_flag="" credit_card_promotional_rate_flag=""/>
</address_details>
</consumer_bureau_response>
</consumer_bureau_service>
</service_response>
</response>
```

Upon receiving the applicant screening report, the PAFT server may determine whether the transferee user applicant passed the screening tests. If the applicant failed the screening tests, the server may generate an application denial notification, e.g., 429*a*. For example, the server may generate a HTTP(S) POST message similar to the example described above. The server may provide the application denial notification to the transferee client, and the transferee client may render, e.g., 430*a*, and display, e.g., 431*a*, the application denial notification for the transferee user.

In some implementations, the server may determine that the transferee user applicant passed the screening tests performed by the screening server based on parsing the applicant screening report. In such implementations, the server may proceed with creation of a new prepaid account for the transferee user. For example, the server may determine whether the new prepaid account can be hosted locally, of if the prepaid account should be hosted at a different bank/branch/server. For example, the server may obtain the prepaid account preferences from the transferor user's prepaid account application invitation request and/or from the transferee user's completed prepaid application. If the new prepaid account can be hosted locally, the server may generate a new user profile and/or user account database record(s) reflecting a new prepaid account for the transferee user, e.g., 429*b*. If the prepaid account is required to be hosted on another server, e.g., bank/branch server 408, the PAFT server may generate a prepaid account opening request message, e.g., 430*b*, for the bank/branch server. For example, the PAFT server may generate a HTTP(S) GET message including a prepaid account opening request message, similar to the example provided below:

```
GET /newaccountrequest.php HTTP/1.1
Host: www.bankbranch.com
Content-Type: Application/XML
Content-Length: 894
<?XML version = "1.0" encoding = "UTF-8"?>
    <new_account_request>
    <request_id>VBUQQW9M,</request_id>
    <request_timestamp>2011-02-10 08:27:13</request_timestamp>
    <requestor_ID>manager@paft.com for transferee@paft.com
    </requestor_ID>
    <account_details>
            <account_holder>individual</account_holder>
            <account_type>prepaid debit</account_type>
            <first_name>John</first_name>
            <last_name>Public</last_name>
            <contact_type>email</contact_type>
            <contact_info>john.q.public@gmail.com</contact_info>
            <opening_balance>$250.00</opening_balance>
    </account_details>
</new_account_request>
```

In some implementations, the bank/branch server may require additional information on the transferee user, invitation request, and/or the like, and may request additional user information, e.g., additional user information request 432. For example, the bank/branch server may provide to the PAFT server a HTTP(S) POST message similar to the examples above. The PAFT server may parse any obtained additional user information request(s), and obtain from local storage, database(s) and/or any PAFT-affiliated entities and/or components the additional information requested, e.g., 433. The PAFT server may in response generate, e.g., 434, an additional user information message, for example, in the form of a HTTP(S) POST message similar to the examples above, and provide the message to the bank/branch server. In some implementations, the bank/branch server may create a new prepaid account for the transferee user based on the information provided by the PAFT server, e.g., 435. The bank/branch server may provide an account issue message, e.g., 436, to notify the PAFT server and/or other PAFT entities and/or components that a prepaid account has been created at the bank/branch server for the transferee user.

In some implementations, the PAFT server may, upon creating the prepaid account for the transferee server (e.g., locally, or at another server such as the bank/branch server), generate a prepaid account link data record that provides a link between the prepaid accounts of the transferor and transferee user. The server may also generate, e.g., 437 a transfer schedule that may specify funds transfer attributes between the transferor and transferee prepaid accounts, such attributes including, but not limited to: number of transfers, transfer dates, transfer frequency, transfer intervals, transfer amounts, transfer notification settings, and/or the like. An example transfer schedule encoded according to the XML format is provided below:

```
<?XML version = "1.0" encoding = "UTF-8"?>
<transfer_schedule>
    <timestamp>2011-02-10 08:27:15</timestamp>
    <transferor_ID>transferor@paft.com</transferor_ID>
    <transferee_ID>transferee@paft.com</transferee_ID>
    <link_ID>45UIVBNYT9</link_ID>
    <num_transfers>6</num_transfers>
    <transfer_date>01 of mo</transfer_date>
    <transfer_frequency>1 per 2 mo</transfer_frequency>
    <transfer_interval>2 mo</transfer_interval>
    <notify_settings>transferor transferee</notify_settings>
</transfer_schedule>
```

In some implementations, the server may store a user profile record, e.g., 438, prepaid account link data record, e.g., 439, and prepaid account funds transfer schedule record, e.g., 440, to database(s), e.g., users database 404*c*, links database 404*d*, and schedules database 404*e*. For example, the server may issue PHP/SQL commands similar to the example below to store the user profile, prepaid account link data, and prepaid account funds transfer schedule records in database(s):

```
<?PHP
header('Content-Type: text/plain');
mysql_connect("254.92.185.103",$DBserver,$password); // access database server
// write user profile data into users database
mysql_select("USERS.SQL"); // select database to append
mysql_query("INSERT INTO UserTable (timestamp, userID, clientIP, usertype,
    firstname, lastname, contacttype, contactinfo, altcontactinfo,
    clienttype,ssn, dob, creditreport, accountnumbers)
VALUES (time( ), $user_ID, $client_IP, $user_type, $first_name, $last_name,
    $contact_type, $contact_info, $alt_contact_info, $client_type,$ssn, $dob,
    $credit_report, $account_num_list)"); // add data to table in database
mysql_close("USERS.SQL"); // close connection to database
// write prepaid account link data into link database
mysql_select("LINKS.SQL"); // select database to append
mysql_query("INSERT INTO LinkTable (timestamp, link_ID, bidirectional_flag,
    transferor_ID, transferor_account_num, transferor_bank, transferor_branch,
    transferor_ABA, transferee_ID, transferee_account_num, transferee_bank,
    transferee_branch, transferee_ABA)
VALUES (time( ), $link_ID, $bi_flag, $transferor_ID, $transferor_account_num,
    $transferor_bank, $transferor_branch, $transferor_ABA, $transferee_ID,
    $transferee_account_num, $transferee_bank, $transferee_branch,
    $transferee_ABA"); // add data to table in database
mysql_close("LINKS.SQL"); // close connection to database
// write prepaid account funds transfer schedule data into schedules database
mysql_select("SCHEDULES.SQL"); // select database to append
mysql_query("INSERT INTO ScheduleTable (timestamp, userID, schedule_data)
VALUES (time( ), $transferor_ID, $transfer_schedule_xml)"); // add data to table
    in database
mysql_close("SCHEDULES.SQL"); // close connection to database
?>
```

In some implementations, the server may provide an account issue notification, e.g., 441, for the transferee (and/or transferor) user(s). For example, the server may provide a HTTP(S) POST message similar to the examples above. The client(s) may render, e.g., 442, the account issue notification for presentation to the user(s). For example, the client(s) may render a webpage, electronic message, text/SMS message, buffer a voicemail, emit a ring tone for the user(s) to answer a phone and/or play an audio message, etc. The client(s) may then present the account issue notification for the user(s), e.g., 443. For example, the client(s) may provide output including, but not limited to: sounds, music, audio, video, images, tactile feedback, vibration alerts (e.g., on vibration-capable client devices such as a smartphone etc.), and/or the like.

FIGS. 5A-D show logic flow diagrams illustrating example aspects of registering a new prepaid account for a user in some embodiments of the PAFT, e.g., a Prepaid Account Registration (PAR) component 500. In some implementations, the transferee user may desire to accept the invitation offer by the server to open a prepaid account with the PAFT. For example, the transferee user may provide invitation acceptance input, e.g., 501, to the transferee client to convey acceptance of the invitation. In response to the transferee user input, the transferee client may generate a prepaid account invitation acceptance message, e.g., 502, for the PAFT server. Upon obtaining, e.g., 503, the prepaid account invitation acceptance message from the transferee client, the server may parse the invitation acceptance to extract the included invitation acceptance data, e.g., 504. For example, the server may extract data fields including, but not limited to: request_id, timestamp, transferor_id, client_IP, transferee_type, first_name, last_name, contact_type, contact_info, client_type, account_params_list, same_bank_flag, same_branch_flag, persistent_link_flag, transfer_param_list, on_schedule_flag, one_time_flag, amount, instant_transfer_flag, custom_invitation, transferee_details_list, transferee_client_IP, client_type, client_MAC, client_IP, presentation_format, pixel_count, resolution, screen_size, audio_fidelity, hardware_settings_list, software_compatibilities_list, installed_apps_list, and/or the like. Based on the extracted data fields, the server may determine the type of transferee client, e.g., 505. For example, the server may determine whether the transferee client is a desktop computer, tablet computer, mobile phone accessing email, text voice messages, etc. For example, the server may determine the attributes of the client device such as the screen resolution, screen size, audio/video capabilities, hardware configuration, software configuration, applications installed on the client, and/or the like. The server may also extract the unique ID of the invitation from the invitation acceptance, e.g., 506. Based on the extracted invitation data, the server may, in some implementations, generate a query for the type of the invitation, e.g., 507, and provide the query to a database, e.g., an invitations database. For example, the server may query for invitation attributes such as, but not limited to: transferee_ type, account_params_list, account_mode, account_type, account_expiry, preferred_bank, preferred_branch, and/or the like. For example, using such data fields server may determine such details as whether the invitation is for an individual/merchant for opening of a credit/debit account, whether the account is prepaid/savings/checking/money market account etc. In response to the server's query, the database may provide the requested information, e.g., 508.

In some implementations, the server may generate a query for a prepaid account application form using the invitation type and client type of the transferee user. The server may generate a query for a prepaid application form, e.g., 509, that is customized to the transferee client and/or transferee user, and issue the query to a database, e.g., a forms database. In response to the prepaid account application form query, the database may provide a prepaid account application form, e.g., 510, that is customized to the attributes and/or preferences of the transferee client and/or transferee user. The server may provide the obtained prepaid account application form, e.g., 511, to the transferee client. Upon obtaining the prepaid account application, the transferee client may render/execute, e.g, 512, the prepaid account application, and present the prepaid account application for the transferee user, e.g., 513.

In some implementations, the transferee user may provide application form input, e.g., 514, to the transferee client. Using the user application form input, the client may generate, e.g., 515, a completed prepaid account application. The transferee client may provide the completed prepaid account application for the server. In some implementations, the server may obtain the completed prepaid account application form from the transferee client, e.g., 516, and parse, e.g., 517, the completed application to extract the application data from the completed prepaid account application form. For example, the server may obtain fields such as, but not limited to: applicant_ID, applicant_firstname, applicant_lastname, dob, ssn, credit_check_ok_flag, address_line1, address_line2, zipcode, city, state, account_params_list, account_mode, account_type, account_expiry, bank_name, branch_name, and/or the like. Based on the application data, the server may generate an application screening request, e.g., 518. In some implementations, the server may generate a request to perform a security and/or credit check on the applicant. Upon receiving the applicant screening request, e.g., 519, the screening server may process, e.g., 520, the applicant screening request, and may generate an applicant screening report, e.g., 521. For example, the screening server may determine whether the applicant passes or fails the screening tests for obtaining a prepaid account with the PAFT. Upon obtaining and parsing, e.g., 522, the applicant screening report, the PAFT server may determine whether the transferee user applicant passed the screening tests, e.g., 523. If the applicant failed the screening tests, e.g., 523, option "No," the server may generate an application denial notification, e.g., 543. The server may provide the application denial notification to the transferee client, and the transferee client may render, e.g., 545, and display, e.g., 546, the application denial notification for the transferee user.

In some implementations, the server may determine that the transferee user applicant passed the screening tests performed by the screening server based on parsing the applicant screening report, e.g., 523, option "Yes." In such implementations, the server may proceed with creation of a new prepaid account for the transferee user. The server may generate a user profile for the transferee user applicant, e.g., 524. The server may also determine whether the new prepaid account can be hosted locally, of if the prepaid account should be hosted at a different bank/branch/server, e.g., 525. For example, the server may obtain the prepaid account preferences from the transferor user's prepaid account application invitation request and/or from the transferee user's completed prepaid application. If the new prepaid account can be hosted locally, e.g., 525, option "No," the server may generate a new user profile and/or user account database record(s) reflecting a new prepaid account for the transferee user, e.g., 526. If the prepaid account is required to be hosted on another server, e.g., 525, option "Yes," the PAFT server may generate a prepaid account opening request message, e.g., 527, for the bank/branch server. The PAFT server may provide the prepaid account opening request message to the bank/branch server where the account should be opened, based on the applicant data extracted from the applicant's completed prepaid account application form. In some implementations, the bank/branch server may, upon obtaining the prepaid account opening request, e.g., 528, parse the prepaid account opening request, e.g., 529, and extract request data. For example, the bank/branch server may extract fields including, but not limited to: applicant_firstname, applicant_lastname, applicant_address_line1, applicant_address_line2, applicant_clear_flag, and/or the like. If the bank/branch server determines that it requires additional information, e.g., 530, for example on the transferee user, invitation request, and/or the like, the bank/branch server may generate an additional user information request, e.g., 531, and provide the request for additional user information to the PAFT server. The PAFT server may parse, e.g., 532, the additional user information request from the bank/branch server, and determine the additional user information requested, e.g., 533. The PAFT server may generate an additional user information message, e.g., 534, using, for example, information obtained from local storage, database(s) and/or any PAFT-affiliated entities and/or components. The PAFT server may provide the message to the bank/branch server. Upon obtaining the additional user information message, e.g., 535, the bank/branch server may, in some implementations, create a new prepaid account for the transferee user based on the information provided by the PAFT server, e.g., 536. The bank/branch server may generate an account issue message, e.g., 537, and provide the account issue message to notify the PAFT server and/or other PAFT entities and/or components that a prepaid account has been created at the bank/branch server for the transferee user.

In some implementations, the PAFT server may, upon obtaining notification (and/or creating) the prepaid account for the transferee server (e.g., locally, or at another server such as the bank/branch server), generate a prepaid account link data record that provides a link between the prepaid accounts of the transferor and transferee user, e.g., 538. The server may also generate, e.g., 539, a prepaid account funds transfer schedule that may specify funds transfer attributes between the transferor and transferee prepaid accounts, such attributes including, but not limited to: number of transfers, transfer dates, transfer frequency, transfer intervals, transfer amounts, transfer notification settings, and/or the like. In some implementations, the server may also generate a user profile record, e.g., 540. The server may provide the user account data record, prepaid account link data record, and/or prepaid account funds transfer schedule record to database(s), e.g., users database, links database, and/or schedules database. In some implementations, the server may provide an account issue notification, e.g., 543, for the transferee (and/or transferor) user(s). The client(s) may render, e.g., 545, the account issue notification for presentation to the user(s). The client(s) may then present the account issue notification for the user(s), e.g., 546.

Figure 6A:
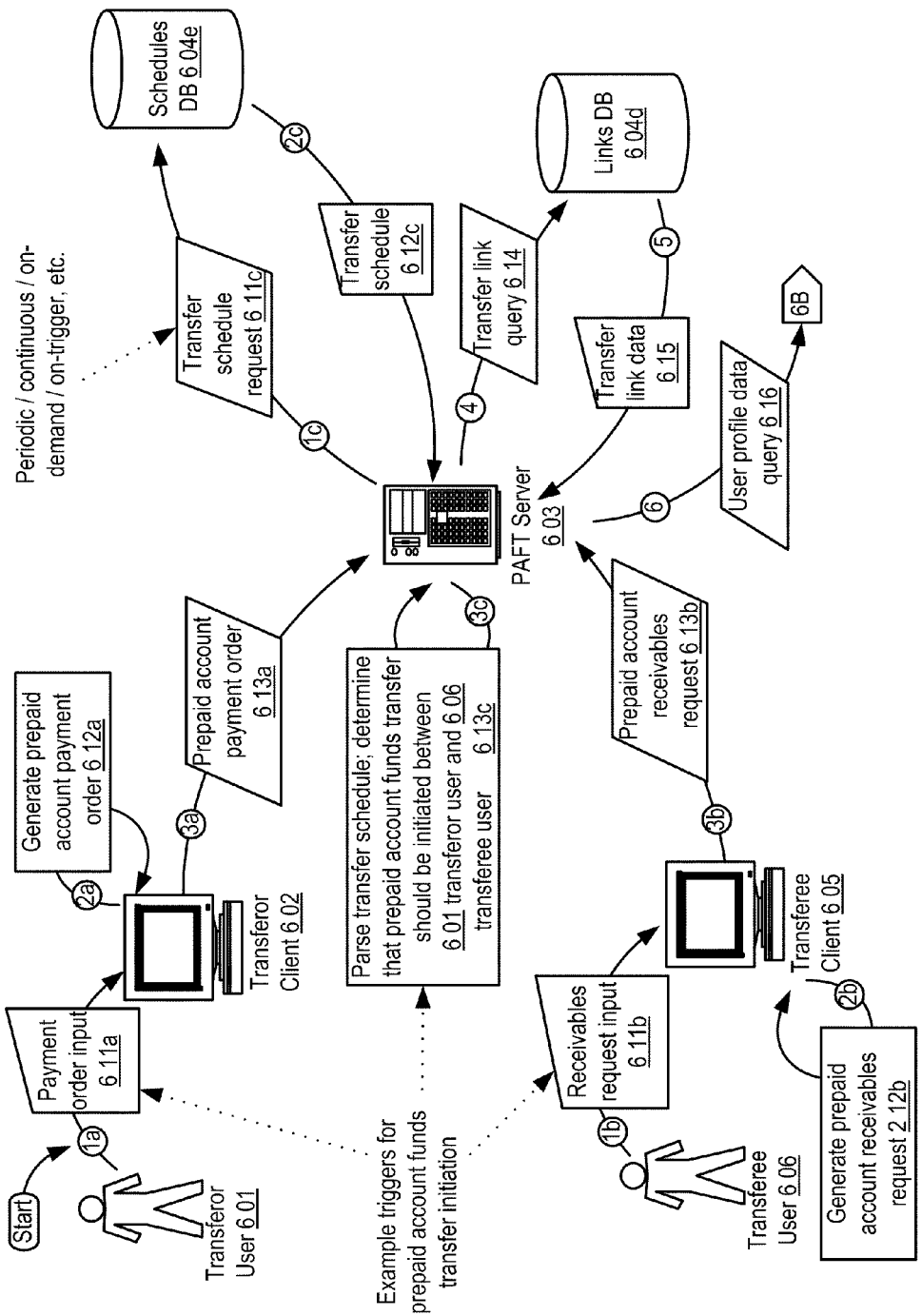
FIGS. 6A-B show data flow diagrams illustrating an example procedure to transfer funds from a prepaid account of a user to a prepaid account of another user in some embodiments of the PAFT.
Figure 6B:
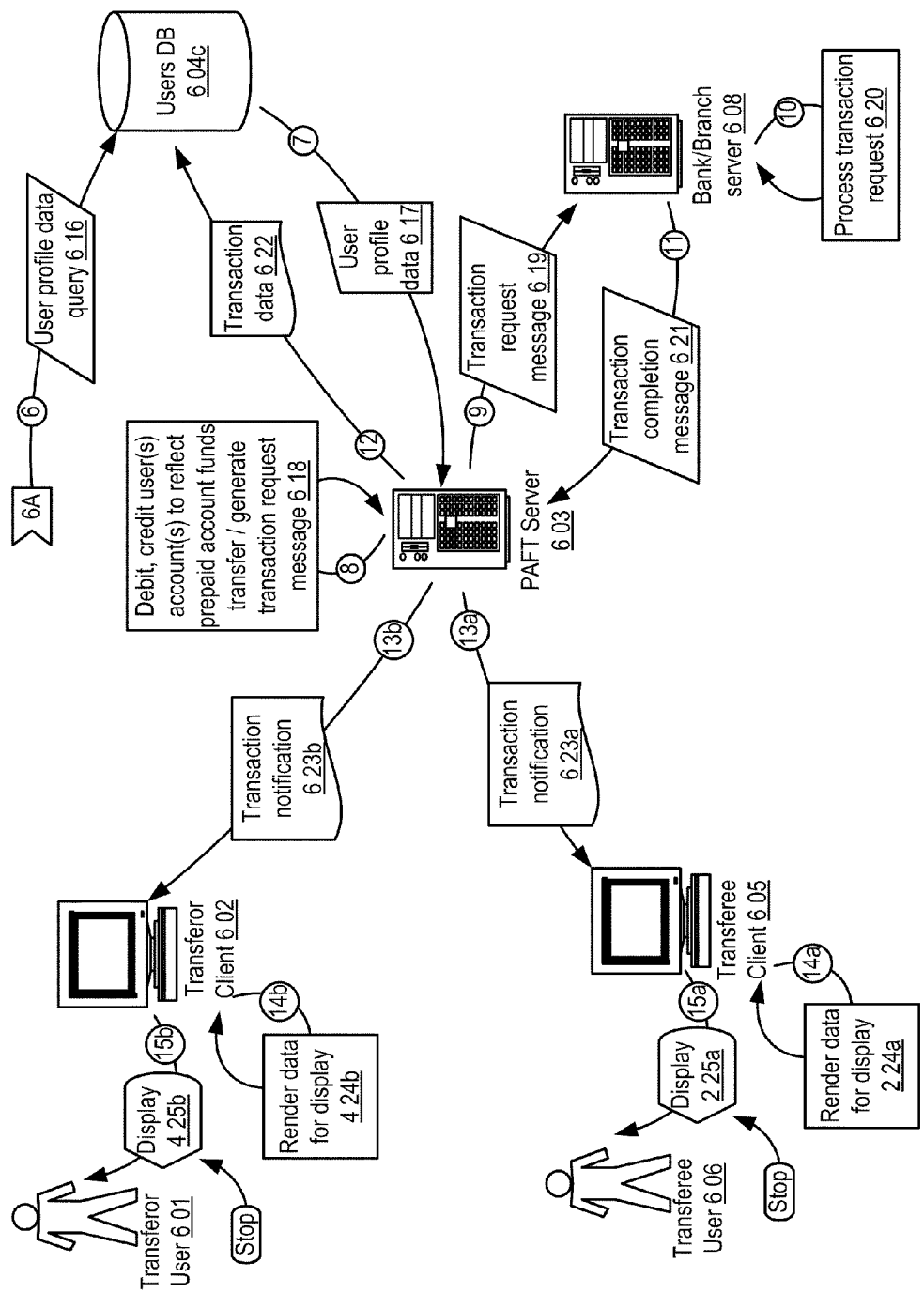

FIGS. 6A-B show data flow diagrams illustrating an example procedure to transfer funds from a prepaid account of a user to a prepaid account of another user in some embodiments of the PAFT. In some implementations, various inputs into a server, e.g. PAFT server 603, may trigger a prepaid account funds transfer from a transferor user's prepaid account to a transferee user's prepaid account.

As an example, the server may spontaneously initiate a prepaid accounts funds transfer upon creation of a new prepaid account (e.g., a transferor and/or transferee user account) by the PAFT and/or affiliated entities and/or components.

As another example, a transferor user, e.g., 601, may provide a payment order input, e.g., 611a, into a transferor client, e.g., 602, requesting that funds be transferred from the transferor user's prepaid account into the transferee user's prepaid account. The transferor client, may utilize the transferor user's payment order input to generate a prepaid account payment order, e.g., 612a. The transferor client may provide the prepaid account payment order, e.g., 613a, to the server, e.g., 603, which may trigger the server to execute transfer of funds as requested by the transferor user.

As another example, a transferee user, e.g., 606, may provide a receivables request input, e.g., 611b, into a transferee client, e.g., 605, requesting that funds owed be transferred from the transferor user's prepaid account into the transferee user's prepaid account. The transferee client may utilize the transferee user's receivables request input to generate a prepaid account receivables request, e.g., 612b. The transferee client may provide the prepaid account receivables request, e.g., 613b, to the server, e.g., 603, which may trigger the server to execute transfer of funds as requested by the transferee user.

As another example, the server, e.g., 603, may query a database, e.g., schedules database 604e, for a transfer schedule, e.g., 611c. For example, the server may query the database on a continuous, periodically, on-demand, on-trigger and/or like basis. In response to the query, the database may provide a transfer schedule, e.g., 612c. The server may obtain the transfer schedule, and parse it to extract schedule data pertaining to transfers between the transferor user, e.g., 601, and the transferee user, e.g., 606. The server may analyze the data, e.g., 613c, to determine whether a transfer should be initiated between the prepaid account of the transferor user and the prepaid account of the transferee user.

In general, it is contemplated that a variety of events and/or changes in data at any of the PAFT components and/or affiliated entities may trigger the PAFT to perform prepaid account funds transfer from a transferor user's prepaid account to a transferee user's prepaid account.

In some implementations, the PAFT server may obtain a trigger, such as those described above, to perform prepaid account funds transfer from a transferor user's prepaid account to a transferee user's prepaid account. In response to the trigger, the server may generate a query for a link data record, and provide the query, e.g., 614, to a database, e.g., links database 604d. For example, the server may issue PHP/SQL commands similar to the example provided below:

```
<?PHP
header('Content-Type: text/plain');
function link_data_query($template_type, $DBserver, $password) {
mysql_connect("254.92.185.102",$DBserver,$password); // access database server
mysql_select_db("LINKS.SQL"); // select database table to search
//create query for invitation template
$query = "SELECT link_ID, bidirectional_flag, transferor_ID,
    transferor_account_num, transferor_bank, transferor_branch, transferor_ABA,
    transferee_ID, transferee_account_num, transferee_bank, transferee_branch,
```

```
transferee_ABA FROM LinksTable WHERE transferor_ID LIKE '%' $transferor AND
   transferee_ID LIKE '%' $transferee";
$result = mysql_query($query); // perform the search query
mysql_close("LINKS.SQL"); // close database access
return $result; // return search results
?>
```

The database may provide the transfer link data record, e.g., 615, in response to obtaining the query from the server. In some implementations, the server may generate a query for one or more user profile data records (e.g., the user profile data records of the transferor user and/or transferee user). The server may provide the user profile data query, e.g., 616, to a database, e.g., users database 604c. For example, the server may issue PHP/SQL commands similar to the example above to the users database. In response to the query, the users database may provide the requested user profile data records.

In some implementations, using the link data record and/or the user profile data records, the server may initiate transfer for funds from the prepaid account of the transferor user to the prepaid account of the transferee user. For example, the server may determine whether the prepaid accounts of the transferor user and the transferee user are both stored locally. If the prepaid accounts are both stored locally, the server may debit the prepaid account of the transferor user, and credit the prepaid account of the transferee user, e.g., 618. Alternatively, in another example, if a prepaid account of the transferor user and/or transferee user is not stored locally, the server may generate one or more transaction request messages using the link data and/or user profile data, and provide the transaction request messages, e.g., 619, to one or more bank/branch servers, e.g., 608. For example, the server may provide a HTTP(S) POST message for the bank/branch server similar to the example provided below:

```
POST /transfers.php HTTP/1.1
Host: www.bankbranch.com
Content-Type: Application/XML
Content-Length: 569
<?XML version = "1.0" encoding = "UTF-8"?>
<account_transfer_request>
    <request_id>VQ358GFBE</request_id>
    <originator>manager@paft.com</orignator>
    <auth>A1834597QG26ABF49T</auth>
    <timestamp>2011-02-09 10:27:13</timestamp>
    <action_type>debit</action_type>
    <action_amount>$250.00</action_amount>
    <account_details>
        <user_ID>transferor@paft.com</user_ID>
        <user_type>individual</user_type>
        <first_name>John</first_name>
        <last_name>Public</last_name>
        <account_num>9087612345</account_num>
        <bank>Chasing Bank</bank>
        <branch>455</branch>
        <ABA>12399876</ABA>
    </account_details>
</account_transfer_request>
```

In response, the bank/branch server may process the transaction request, e.g., 620, and provide a transaction completion message, e.g., 621, for the PAFT server. Upon obtaining the transaction completion message(s) for the bank/branch server(s) involved in the prepaid account funds transfer, the PAFT server may generate transaction notification message(s), and provide the transaction notification message(s), e.g., 623a-b, to the transferor client and/or transferee client. For example, the server may provide a HTTP(S) POST message similar to the examples above. The client(s) may render, e.g., 442, the transaction notification message(s) for presentation to the user(s). For example, the client(s) may render a webpage, electronic message, text/SMS message, buffer a voicemail, emit a ring tone for the user(s) to answer a phone and/or play an audio message, etc. The client(s) may then present the transaction notification message(s) for the user(s), e.g., 443. For example, the client(s) may provide output including, but not limited to: sounds, music, audio, video, images, tactile feedback, vibration alerts (e.g., on vibration-capable client devices such as a smartphone etc.), and/or the like.

FIG. 7 shows a logic flow diagram illustrating example aspects of implementing a transferor user-initiated trigger for prepaid account funds transfer in some embodiments of the PAFT, e.g., a Transferor-Initiated Funds Transfer Trigger (Tr-FTT) component 700. In some implementations, a transferor user may provide payment order input, e.g., 701, into a transferor client. In response, the transferor client may generate a prepaid account payment order, e.g., 702. The transferor client may provide the generated prepaid account payment order to the PAFT server. In some implementations, the server may, upon obtaining the order, e.g., 703, parse the obtained prepaid account payment order, e.g., 704. The server may extract the details of the prepaid account payment order, and determine, e.g., 705, whether funds should be transferred from a prepaid account of the transferor user to the prepaid account of the transferee user, based on the details provided in the prepaid account transfer order. For example, server may perform security checks to ensure that the order is issued by an authorized entity, that the amount of the transfer passes fraud checks, and/or the like. The server may also determine whether the account information, amount information, etc. are provided properly in the prepaid account transfer order. If the server determines that the prepaid account funds transfer must be performed, e.g., 706, option "Yes," the server may generate a prepaid account funds transfer trigger, e.g., 710. In some implementations, the server may push the generated prepaid account funds transfer trigger to a queue of prepaid account funds transfer triggers. In some implementations, the server may determine that the prepaid account funds transfer should not take place, e.g., 706, option "No." The server may, in such implementations, generate a payment order cancel notice, e.g., 707, and provide the generated payment order cancel notice for the transferor client. The transferor client may render the obtained payment order cancel notice, e.g., 708, and provide the rendered payment order cancel notice for the transferor user, e.g., 709. For example, the client(s) may provide output including, but not limited to: sounds, music, audio, video, images, tactile feedback, vibration alerts (e.g., on vibration-capable client devices such as a smartphone etc.), and/or the like.

Figure 8:
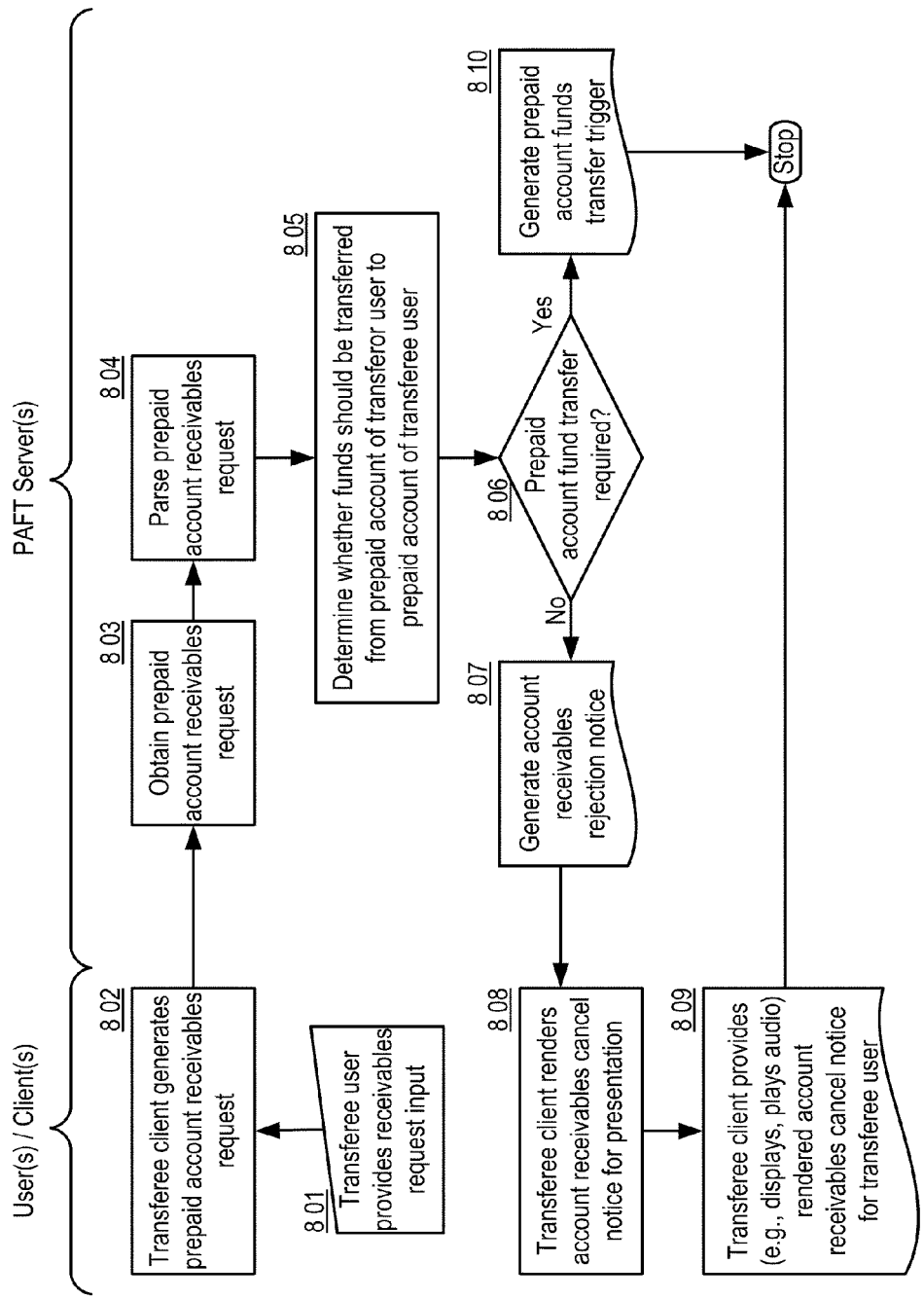
FIG. 8 shows a logic flow diagram illustrating example aspects of implementing a transferee user-initiated trigger for prepaid account funds transfer in some embodiments of the PAFT, e.g., a Transferee-Initiated Funds Transfer Trigger (Te-FTT) component 800.

FIG. 8 shows a logic flow diagram illustrating example aspects of implementing a transferee user-initiated trigger for prepaid account funds transfer in some embodiments of the PAFT, e.g., a Transferee-Initiated Funds Transfer Trigger (Te-FTT) component 800. In some implementations, a transferee user may provide receivables request input, e.g., 801, into a transferee client. In response, the transferee client may generate a prepaid account receivables request, e.g., 802. The transferee client may provide the generated prepaid account receivables request to the PAFT server. In some implementations, the server may, upon obtaining the prepaid account receivables request, e.g., 803, parse the obtained prepaid account receivables request, e.g., 804. The server may extract the details of the prepaid account receivables request, and determine, e.g., 805, whether funds should be transferred from a prepaid account of the transferor user to the prepaid account of the transferee user, based on the details provided in the prepaid account receivables request. For example, server may perform security checks to ensure that the order is issued by an authorized entity, that the amount of the transfer passes fraud checks, and/or the like. The server may also determine whether the account information, amount information, etc. are provided properly in the prepaid account receivables request. If the server determines that the prepaid account funds transfer must be performed, e.g., 806, option "Yes," the server may generate a prepaid account funds transfer trigger, e.g., 810. In some implementations, the server may push the generated prepaid account funds transfer trigger to a queue of prepaid account funds transfer triggers. In some implementations, the server may determine that the prepaid account funds transfer should not take place, e.g., 806, option "No." The server may, in such implementations, generate an account receivables rejection notice, e.g., 807, and provide the generated account receivables rejection notice for the transferee client. The transferee client may render the obtained account receivables rejection notice, e.g., 808, and provide the rendered account receivables rejection notice for the transferee user, e.g., 809. For example, the client(s) may provide output including, but not limited to: sounds, music, audio, video, images, tactile feedback, vibration alerts (e.g., on vibration-capable client devices such as a smartphone etc.), and/or the like.

Figure 9:
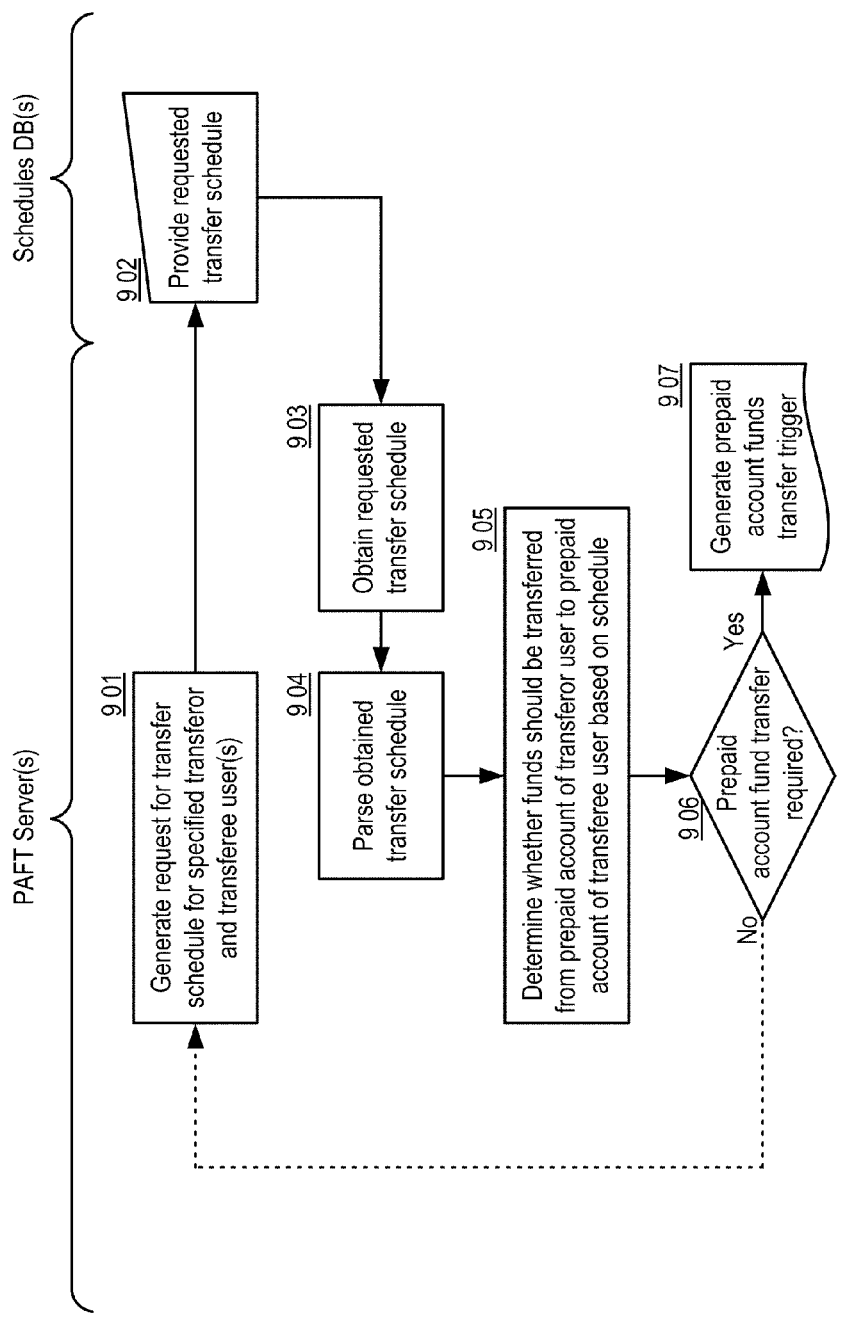
FIG. 9 shows a logic flow diagram illustrating example aspects of implementing a server-initiated trigger for prepaid account funds transfer in some embodiments of the PAFT, e.g., a Server-Initiated Funds Transfer Trigger (S-FTT) component 900.

FIG. 9 shows a logic flow diagram illustrating example aspects of implementing a server-initiated trigger for prepaid account funds transfer in some embodiments of the PAFT, e.g., a Server-Initiated Funds Transfer Trigger (S-FTT) component 900. In some implementations, the PAFT server may generate, e.g., 901, a request for a transfer schedule for specified transferor and transferee user(s), and may provide the request for a database, e.g., schedules database. For example, the server may query the database on a continuous, periodically, on-demand, on-trigger and/or like basis. In response to the request, the database may provide the requested transfer schedule, e.g., 902. The server may obtain the transfer schedule, e.g., 903, and parse it to extract schedule data pertaining to transfers between the transferor user(s) and transferee user(s), e.g., 904. The server may analyze the data, e.g., 905, to determine whether a transfer should be initiated between the prepaid account of the transferor user and the prepaid account of the transferee user. If the server determines that a transfer should be initiated between the prepaid account of the transferor user and prepaid account of the transferee user, e.g., 906, option "Yes," the server may generate a prepaid account funds transfer trigger, e.g., 907. If, however, the server determines that a transfer should not be initiated between the prepaid account of the transferor user and prepaid account of the transferee user, e.g., option 906, option "No," the server may reset the procedure, and repeat the procedure if necessary.

Figure 10A:
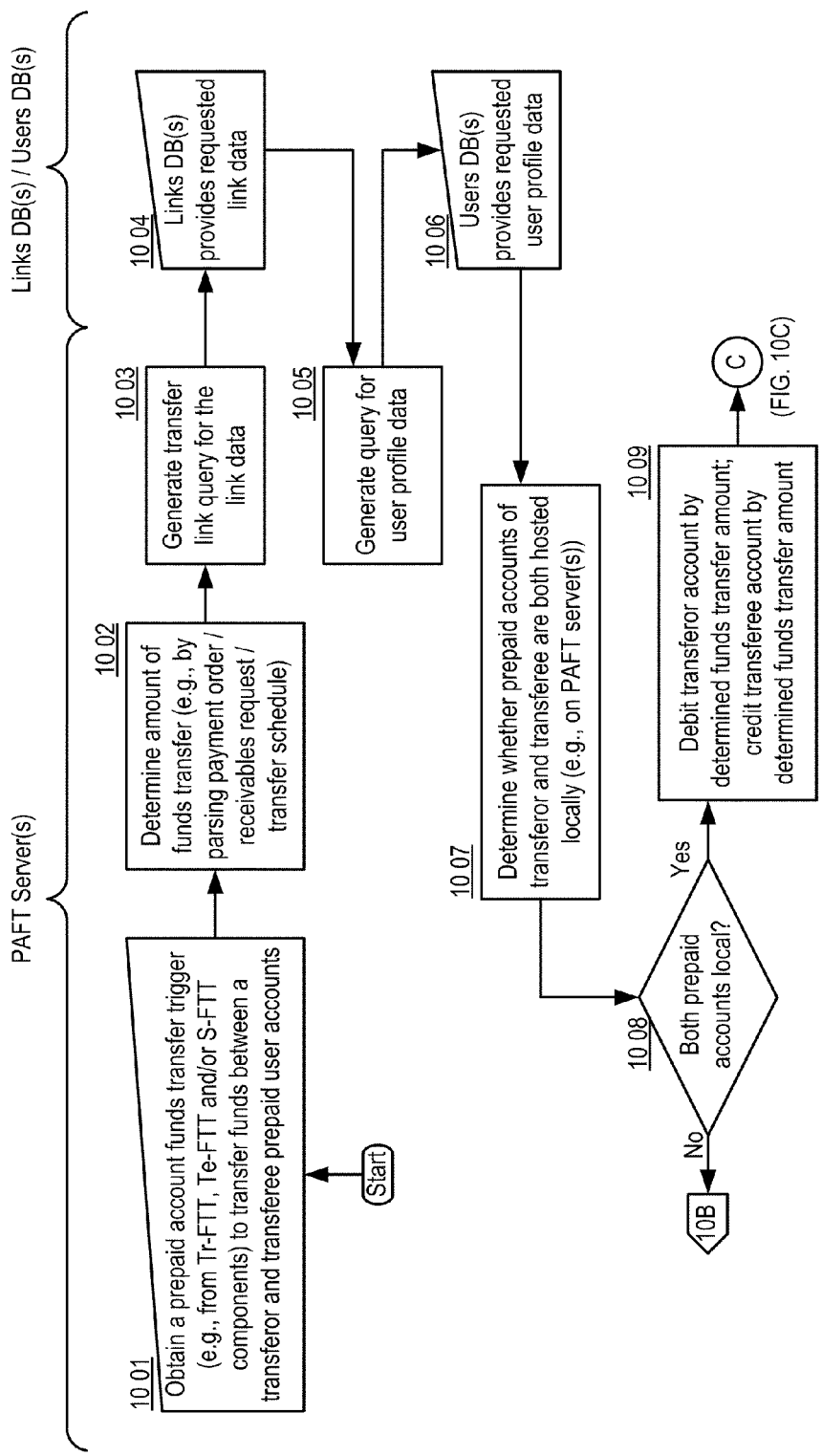
FIGS. 10A-C show logic flow diagrams illustrating example aspects of transferring funds from a prepaid account of a user to a prepaid account of another user in some embodiments of the PAFT, e.g., a Prepaid Account Funds Transfer Processing (PA-FTP) component 1000.
Figure 10B:
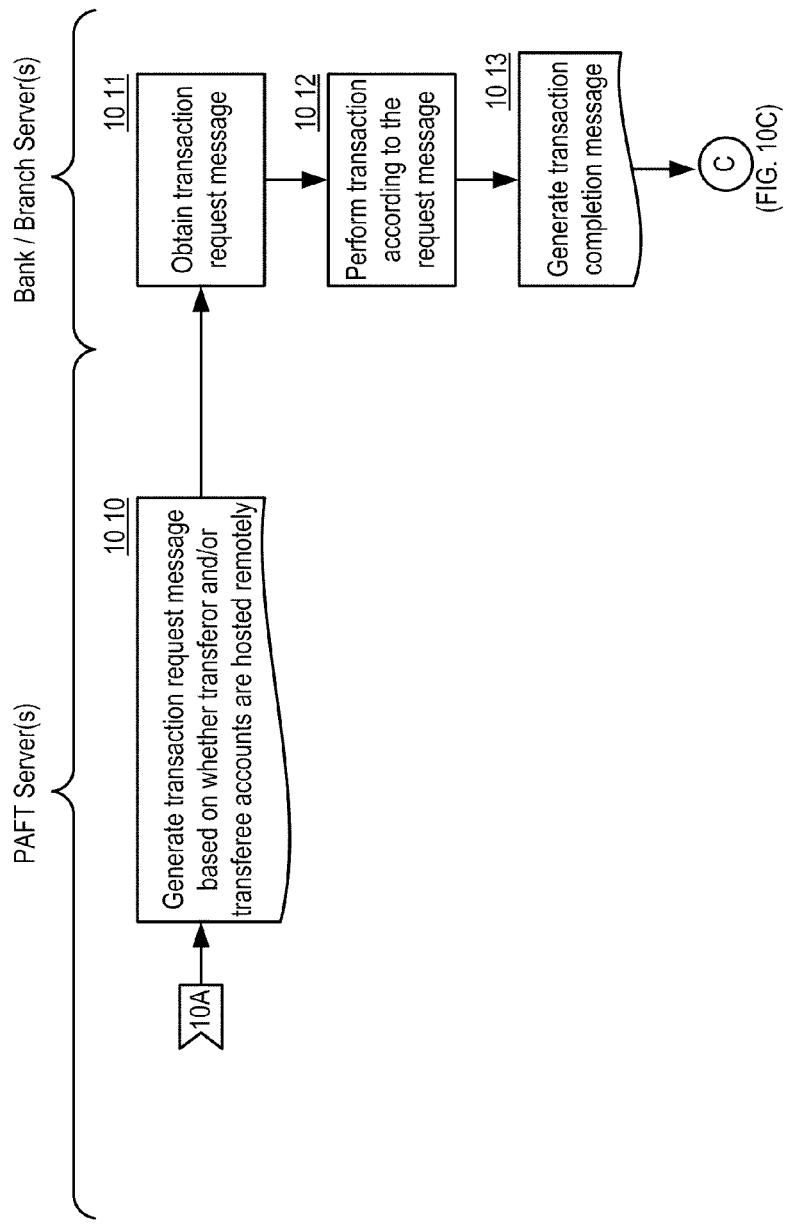
Figure 10C:
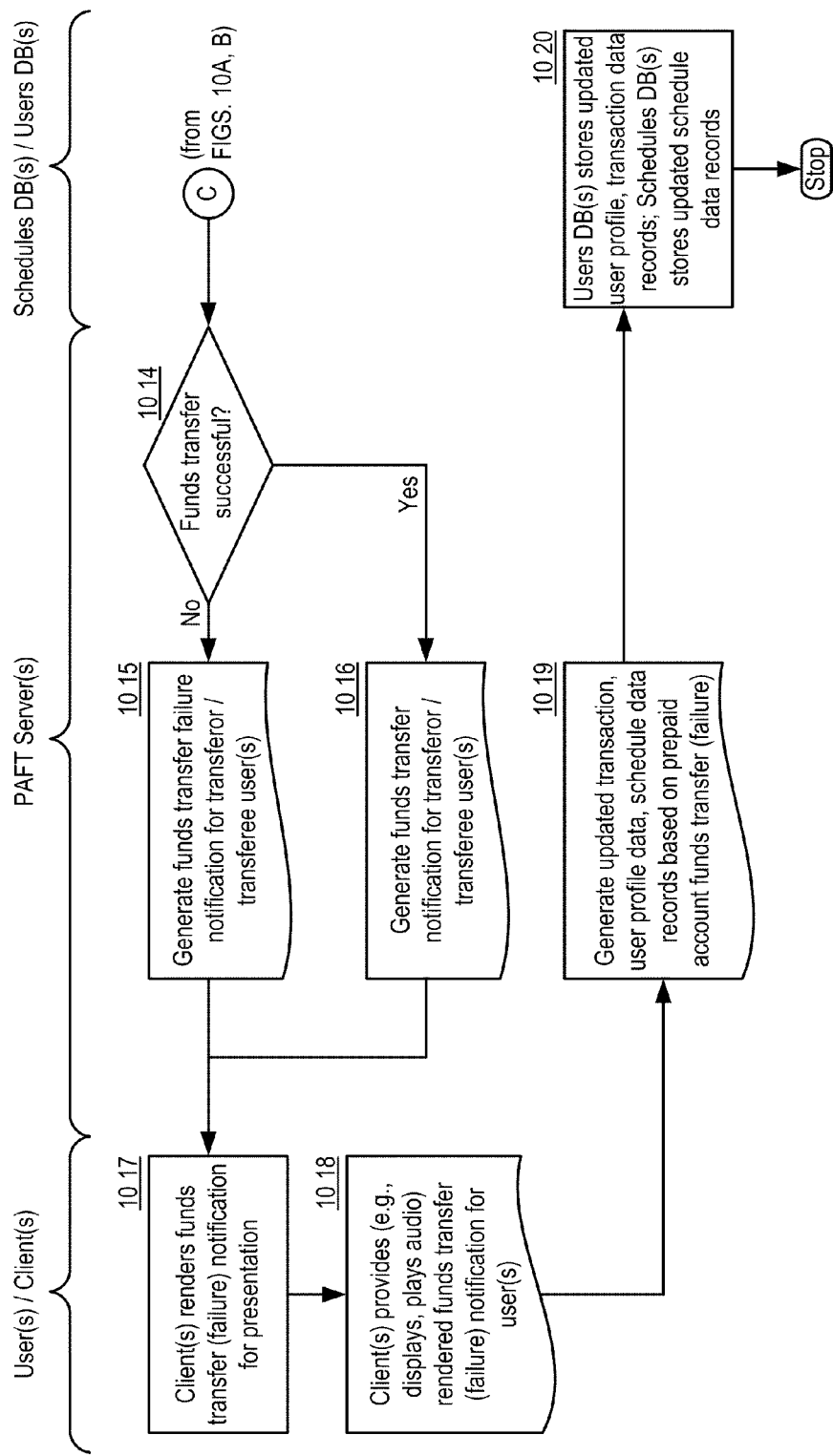

FIGS. 10A-C show logic flow diagrams illustrating example aspects of transferring funds from a prepaid account of a user to a prepaid account of another user in some embodiments of the PAFT, e.g., a Prepaid Account Funds Transfer Processing (PA-FTP) component 1000. In some implementations, the PAFT server may obtain a prepaid account funds transfer trigger, e.g., 1001, to transfer funds between a transferor prepaid user account and a transferee prepaid user account. For example, the server may obtain the trigger from a queue of prepaid account funds transfer triggers, from a Tr-FTT component, e.g., 700, a Te-FTT component, e.g., 800, a S-FTT component, e.g., 900, and/or the like PAFT entity and/or component. Upon obtaining the prepaid account funds transfer trigger, the server may determine an amount of the funds to be transferred from the prepaid account of the transferor user to the prepaid account of the transferee user, e.g., 1002. For example, the server may parse a payment order, a receivables request, a transfer schedule, and/or the like data records to obtain an amount of funds to be transferred. Upon determining the transfer amount, the server may generate a transfer link query for link data pertaining to a link between the prepaid accounts of the transferor user and the transferee user, e.g., 1003. The server may provide the transfer link query to a database, e.g., a links database. In response, the database may provide the requested link data, e.g., 1004. In some implementations, the server may generate a query for user profile data of the transferor and/or transferee user(s), e.g., 1005. The server may issue the user profile data queries to a database, e.g., a users database. In response to receiving the user profile data queries, the database may provide the requested user profile data, e.g., 1006. Upon obtaining the link data and/or the user data from the database(s), the server may determine whether the prepaid accounts of the transferor and transferee users are stored locally, e.g., 1007.

If the server determines that both prepaid accounts are stored locally, e.g., 1008, option "Yes," the server may debit the prepaid account of the transferor user by the determined amount of the prepaid account funds transfer, and credit the prepaid account of the transferee user by the determined amount of the prepaid account funds transfer, e.g., 1009. In some implementations, the server may determine that both prepaid accounts are not stored locally, e.g., 1008, option "No." The server may, in such implementations, generate one or more transaction request message(s) to perform prepaid account actions (e.g., credit and/or debit). The server may provide the transaction request message(s) to one or more bank/branch servers. The bank/branch server, upon obtaining the transaction request message, e.g., 1011, may perform the transaction according to the request message, e.g., 1012. The bank/branch server may generate a transaction completion message, e.g., 1013, and provide the transaction completion message to the PAFT server.

In some implementations, the PAFT server may obtain an indication that funds transfer has been successfully completed between the prepaid accounts of the transferor user and transferee user. If the server determines that the funds transfer was successful, e.g., 1014, option "Yes," the server may generate a funds transfer notification message for the transferor and/or transferee user, e.g., 1016. If the server determines that the funds transfer was not successful, e.g., 1014, option "No," the server may generate a funds transfer failure notification message for the transferor and/or transferee user, e.g., 1015. The server may provide the generated notifications for the transferor and/or transferee clients. The client may render, e.g., 1017, the notifications, and present, e.g., 1018, the notifications for the users. In some implementations, the server may generate, e.g., 1019, updated transaction data, user profile data, and/or schedule data records based on the prepaid account funds transfer (or failure thereof), and provide the data records to database(s). The database(s), e.g., schedules database(s) and/or users database(s), may store, e.g., 1020, the data records provided by the server.

Figure 11:
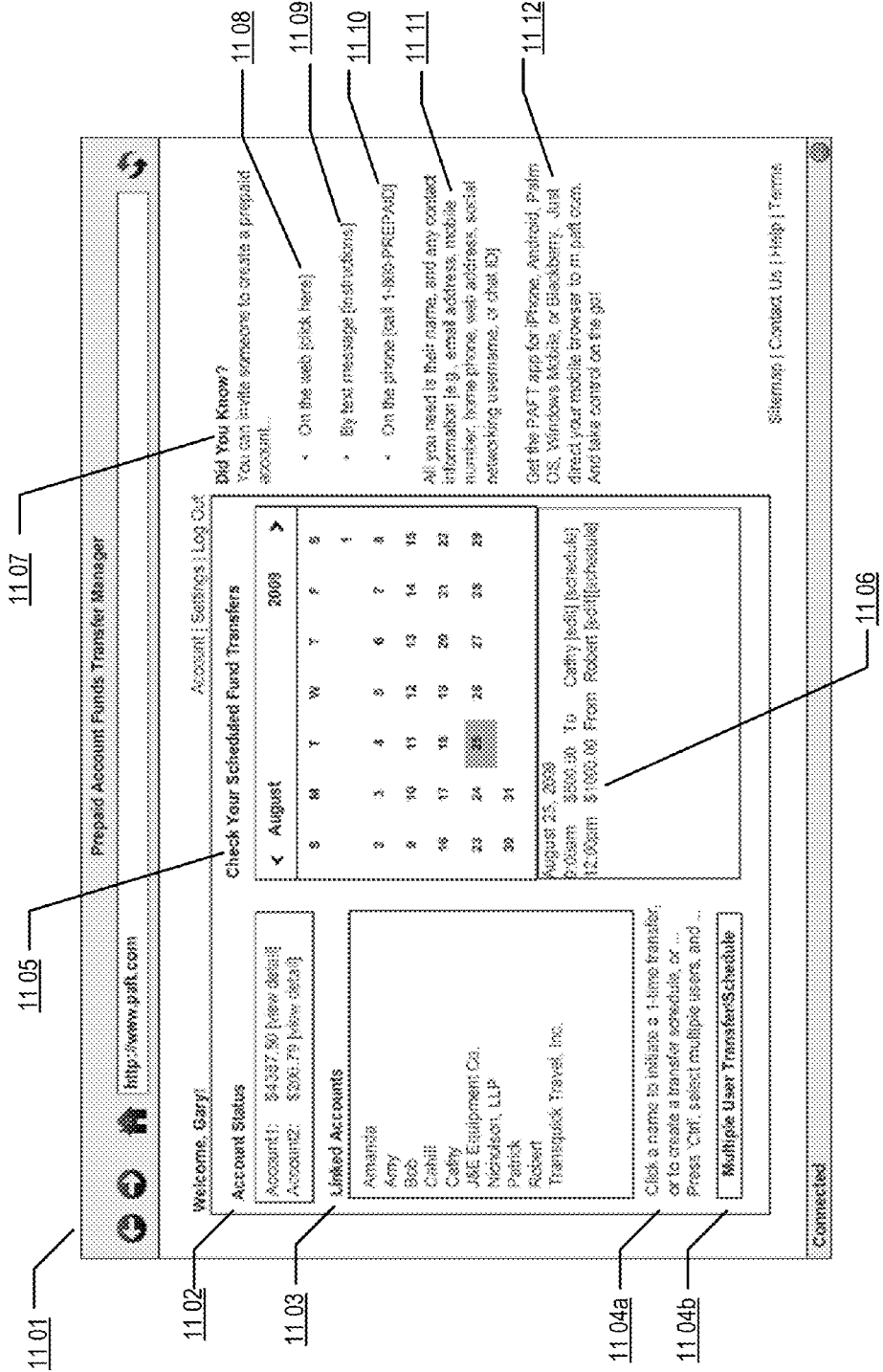
FIG. 11 shows a user interface diagram illustrating example aspects of managing prepaid account funds transfers in some embodiments of the PAFT.

FIG. 11 shows a user interface diagram illustrating example aspects of managing prepaid account funds transfers in some embodiments of the PAFT. In some implementations, the PAFT may enable a user to manage a prepaid account (e.g., manage transfer of funds to and from the prepaid account) via an interface. For example, the user may be able to manage the prepaid account via a web browser interface, e.g., 1101. In some implementations, the user may be able to download an application (e.g., an iPhone® app, Android™ app, HP Palm OS app, Windows® Mobile app, Blackberry® app, etc.) on to their client device, which may then provide an interface for prepaid account management (see, e.g., 1112). The interface may provide notifications of the status of one or more prepaid account, e.g., 1102. For example, the interface may provide details such as, but not limited to: number of accounts, account numbers, account balances, account transaction history, transaction history statistics (e.g., number of transactions within a predetermined/flexible time window, frequency of transactions, cumulative transaction amounts across time, accounts, and/or other users, transactions by user, indications of amount of bidirectionality of transfers, etc.), upcoming scheduled transfer, and/or the like. In some implementations, the information such as those listed above may be provided on a single screen simultaneously. In alternate implementations, the user interface may be designed as a complex multiple-screen interface that may present detailed information across various types of analyses using multiple screens. In some implementations, the interface may provide a listing of contacts, e.g., 1103. For example, the contacts listing may include a listing of others users with whom the user has engaged in prepaid account funds transfers (e.g., as transferor and/or transferee). In some implementations, the user may be able to activate a link (see, e.g., 1104*a*) to initiate a transfer with another user, and/or to create a transfer schedule for prepaid account funds transfers with that user. For example, one or more user(s) listed in the contacts listing may be selected simultaneously (e.g., by clicking a single user, selecting multiple users and activating a graphical user interface element for initiating/scheduling transfers with each of the selected users simultaneously), which when activated, provides the user an interface wherein the user can initiate and/or schedule prepaid account funds transfer(s) with the selected user(s) (see, e.g., 1104*b*). In some implementations, the user interface may include one or more graphical user interface elements to provide information on upcoming scheduled transfers, e.g., graphical calendar 1105 and textual schedule listing 1106. The graphical user elements may provide indication, alarms, notifications, etc. of due and/or upcoming transfers. In some implementations, the PAFT may send alerts, notices, notifications, and/or the like to a contact of the user (e.g., pager number, mobile number, email address, postal address) for the user.

In some implementations, the user interface may provide various elements for inviting (see, e.g., 1107) other users to apply for obtaining new prepaid accounts with the PAFT. For example, the user interface may provide a hyperlink, e.g., 1108, upon activation of which the user may be provided with graphical user interface elements to generate and send invitation requests for the PAFT. In various implementations, the user may e able to invite other user to create prepaid accounts with the PAFT via text message, e.g., 1109, phone, e.g., 1110, chat, social networking, e.g., 1111, and/or the like.

PAFT Controller

Figure 12:
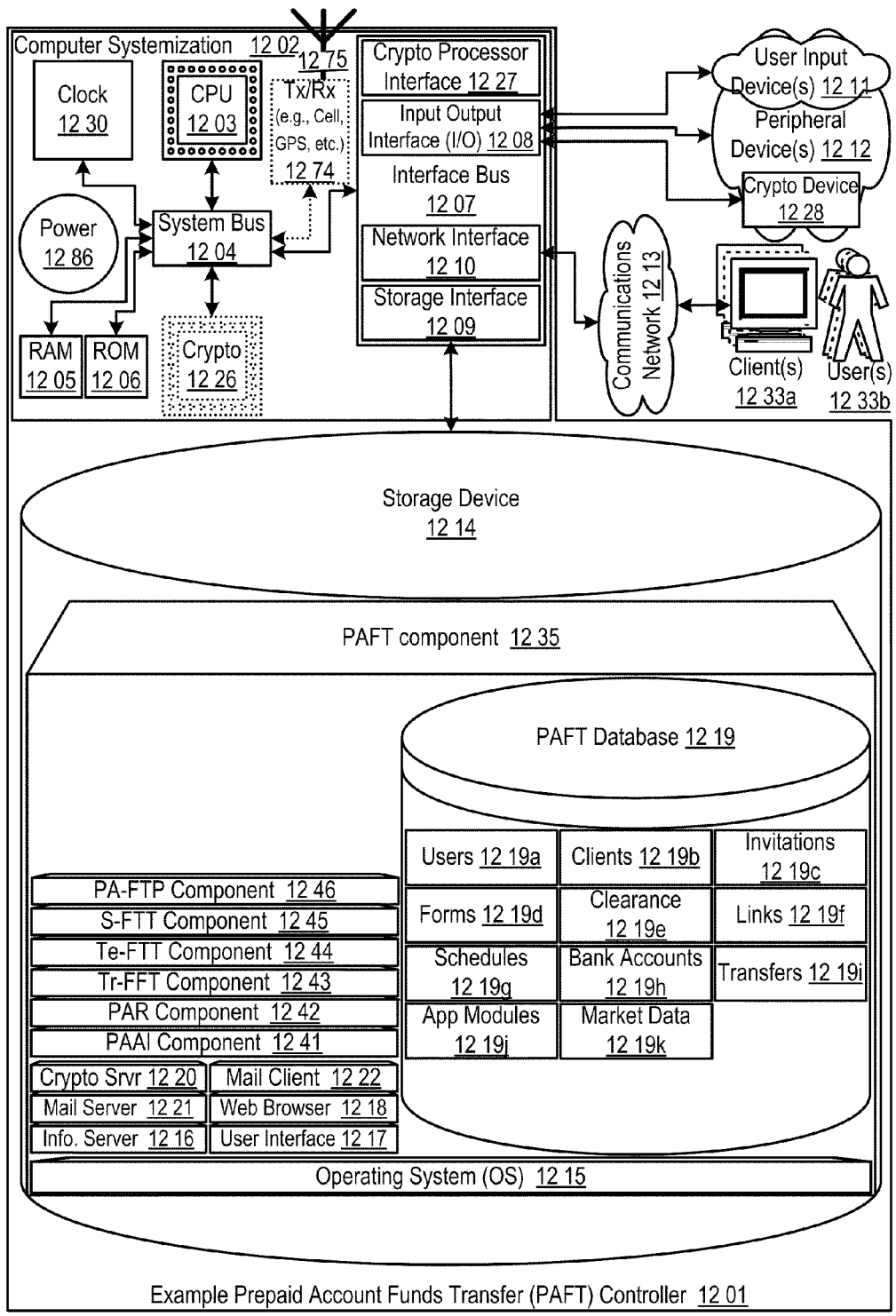
FIG. 12 shows a block diagram illustrating embodiments of a PAFT controller.

FIG. 12 illustrates inventive aspects of a PAFT controller 1201 in a block diagram. In this embodiment, the PAFT controller 1201 may serve to aggregate, process, store, search, serve, identify, instruct, generate, match, and/or facilitate interactions with a computer through various technologies, and/or other related data.

Typically, users, which may be people and/or other systems, may engage information technology systems (e.g., computers) to facilitate information processing. In turn, computers employ processors to process information; such processors 1203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the PAFT controller 1201 may be connected to and/or communicate with entities such as, but not limited to: one or more users from user input devices 1211; peripheral devices 1212; an optional cryptographic processor device 1228; and/or a communications network 1213.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The PAFT controller 1201 may be based on computer systems that may comprise, but are not limited to, components such as: a computer systemization 1202 connected to memory 1229.

Computer Systemization

A computer systemization 1202 may comprise a clock 1230, central processing unit ("CPU(s)") and/or "processor(s)" (these terms are used interchangeable throughout the disclosure unless noted to the contrary)) 1203, a memory 1229 (e.g., a read only memory (ROM) 1206, a random access memory (RAM) 1205, etc.), and/or an interface bus 1207, and most frequently, although not necessarily, are all interconnected and/or communicating through a system bus 1204 on one or more (mother)board(s) 1202 having conductive and/or otherwise transportive circuit pathways through which instructions (e.g., binary encoded signals) may travel to effect communications, operations, storage, etc. Optionally, the computer systemization may be connected to an internal power source 1286; e.g., optionally the power source may be internal. Optionally, a cryptographic processor 1226 and/or transceivers (e.g., ICs) 1274 may be connected to the system bus. In another embodiment, the cryptographic processor and/or transceivers may be connected as either internal and/or external peripheral devices 1212 via the interface bus I/O. In turn, the transceivers may be connected to antenna(s) 1275, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing PAFT controller to determine its location)); Broadcom BCM4329FKUBG transceiver chip (e.g., providing 802.11n, Bluetooth 2.1+ EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. Of course, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 529 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the PAFT controller and beyond through various interfaces. Should processing requirements dictate a greater amount speed and/or capacity, distributed processors (e.g., Distributed PAFT), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the PAFT may be achieved by implementing a microcontroller such as CAST's R8051XC2 microcontroller; Intel's MCS 51 (i.e., 8051 microcontroller); and/or the like. Also, to implement certain features of the PAFT, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the PAFT component collection (distributed or otherwise) and/or features may be implemented via the microprocessor and/or via embedded components; e.g., via ASIC, coprocessor, DSP, FPGA, and/or the like. Alternately, some implementations of the PAFT may be implemented with embedded components that are configured and used to achieve a variety of features or signal processing.

Depending on the particular implementation, the embedded components may include software solutions, hardware solutions, and/or some combination of both hardware/software solutions. For example, PAFT features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the PAFT features. A hierarchy of programmable interconnects allow logic blocks to be interconnected as needed by the PAFT system designer/administrator, somewhat like a one-chip programmable breadboard. An FPGA's logic blocks can be programmed to perform the function of basic logic gates such as AND, and XOR, or more complex combinational functions such as decoders or simple mathematical functions. In most FPGAs, the logic blocks also include memory elements, which may be simple flip-flops or more complete blocks of memory. In some circumstances, the PAFT may be developed on regular FPGAs and then migrated into a fixed version that more resembles ASIC implementations. Alternate or coordinating implementations may migrate PAFT controller features to a final ASIC instead of or in addition to FPGAs. Depending on the implementation all of the aforementioned embedded components and microprocessors may be considered the "CPU" and/or "processor" for the PAFT.

Power Source

The power source 1286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1286 is connected to at least one of the interconnected subsequent components of the PAFT thereby providing an electric current to all subsequent components. In one example, the power source 1286 is connected to the system bus component 1204. In an alternative embodiment, an outside power source 1286 is provided through a connection across the I/O 1208 interface. For example, a USB and/or IEEE 1394 connection carries both data and power across the connection and is therefore a suitable source of power.

Interface Adapters

Interface bus(ses) 1207 may accept, connect, and/or communicate to a number of interface adapters, conventionally although not necessarily in the form of adapter cards, such as but not limited to: input output interfaces (I/O) 1208, storage interfaces 1209, network interfaces 1210, and/or the like. Optionally, cryptographic processor interfaces 1227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1209 may accept, communicate, and/or connect to a number of storage devices such as, but not limited to: storage devices 1214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1210 may accept, communicate, and/or connect to a communications network 1213. Through a communications network 1213, the PAFT controller is accessible through remote clients 1233*b* (e.g., computers with web browsers) by users 1233*a*. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed PAFT), architectures may similarly be employed to pool, load balance, and/or otherwise increase the communicative bandwidth required by the PAFT controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 1210 may be used to engage with various communications network types 1213. For example, multiple network interfaces may be employed to allow for the communication over broadcast, multicast, and/or unicast networks.

Input Output interfaces (I/O) 1208 may accept, communicate, and/or connect to user input devices 1211, peripheral devices 1212, cryptographic processor devices 1228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 1211 often are a type of peripheral device 512 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 1212 may be connected and/or communicate to I/O and/or other facilities of the like such as network interfaces, storage interfaces, directly to the interface bus, system bus, the CPU, and/or the like. Peripheral devices may be external, internal and/or part of the PAFT controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities;

e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the PAFT controller may be embodied as an embedded, dedicated, and/or monitor-less (i.e., headless) device, wherein access would be provided over a network interface connection.

Cryptographic units such as, but not limited to, microcontrollers, processors 1226, interfaces 1227, and/or devices 1228 may be attached, and/or communicate with the PAFT controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 1229. However, memory is a fungible technology and resource, thus, any number of memory embodiments may be employed in lieu of or in concert with one another. It is to be understood that the PAFT controller and/or a computer systemization may employ various forms of memory 1229. For example, a computer systemization may be configured wherein the functionality of on-chip CPU memory (e.g., registers), RAM, ROM, and any other storage devices are provided by a paper punch tape or paper punch card mechanism; of course such an embodiment would result in an extremely slow rate of operation. In a typical configuration, memory 1229 will include ROM 1206, RAM 1205, and a storage device 1214. A storage device 1214 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 1229 may contain a collection of program and/or database components and/or data such as, but not limited to: operating system component(s) 1215 (operating system); information server component(s) 1216 (information server); user interface component(s) 1217 (user interface); Web browser component(s) 1218 (Web browser); database(s) 1219; mail server component(s) 1221; mail client component(s) 1222; cryptographic server component(s) 1220 (cryptographic server); the PAFT component(s) 1235; and/or the like (i.e., collectively a component collection). These components may be stored and accessed from the storage devices and/or from storage devices accessible through an interface bus. Although non-conventional program components such as those in the component collection, typically, are stored in a local storage device 1214, they may also be loaded and/or stored in memory such as: peripheral devices, RAM, remote storage facilities through a communications network, ROM, various forms of memory, and/or the like.

Operating System

The operating system component 1215 is an executable program component facilitating the operation of the PAFT controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Nan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the PAFT controller to communicate with other entities through a communications network 1213. Various communication protocols may be used by the PAFT controller as a subcarrier transport mechanism for interaction, such as, but not limited to: multicast, TCP/IP, UDP, unicast, and/or the like.

Information Server

An information server component 1216 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the PAFT controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the PAFT database 1219, operating systems, other program components, user interfaces, Web browsers, and/or the like.

Access to the PAFT database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the PAFT. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the PAFT as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1218 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Of course, in place of a Web browser and information server, a combined application may be developed to perform similar functions of both. The combined application would similarly affect the obtaining and the provision of information to users, user agents, and/or the like from the PAFT enabled nodes. The combined application may be nugatory on systems employing standard Web browsers.

Mail Server

A mail server component 1221 is a stored program component that is executed by a CPU 1203. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the PAFT.

Access to the PAFT mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1222 is a stored program component that is executed by a CPU 1203. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1220 is a stored program component that is executed by a CPU 1203, cryptographic processor 1226, cryptographic processor interface 1227, cryptographic processor device 1228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash function), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the PAFT may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the PAFT component to engage in secure transactions if so desired. The cryptographic component facilitates the secure accessing of resources on the PAFT and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The PAFT Database

The PAFT database component 1219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the PAFT database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of functionality encapsulated within a given object. If the PAFT database is implemented as a data-structure, the use of the PAFT database 1219 may be integrated into another component such as the PAFT component 1235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 1219 includes several tables 1219*a-k*. A User table 1219*a* may include fields such as, but not limited to: user_id, applicant_id, firstname, lastname, address_line1, address_line2, dob, ssn, credit_check_flag, zipcode, city, state, account_params_list, account_mode, account_type, account_expiry, preferred_bank_name, preferred_branch_name, credit_report, and/or the like. The User table may support and/or track multiple entity accounts on a PAFT. A Clients table 1219*b* may include fields such as, but not limited to: client_ID, client_type, client_MAC, client_IP, presentation_format, pixel_count, resolution, screen_size, audio_fidelity, hardware_settings_list, software_compatibilities_list, installed_apps_list, and/or the like. An Invitations table 1219*c* may include fields such as, but not limited to: request_id, timestamp, transferor_id, client_IP, transferee_details_list, transferee_type, first_name, last_name, contact_type, contact_info, alt_contact_info, alt_contact_type, alt_contact_info, client_type, num_invite_attempts, account_params_list, same_bank_flag, same_branch_flag, persistent_link_flag, transfer_param_list, on_schedule_flag, one_time_flag, amount, instant_transfer_flag, custom_invitation, transferee_details_list, transferee_client_IP, and/or the like. A Forms table 1219*d* may include fields such as, but not limited to: invitation_template_list, invitation_type, invitation_data, and/or the like. A Clearance table 1219*e* may include fields such as, but not limited to: applicant_firstname, applicant_lastname, applicant_address_line1, applicant_address_line2, consumer_bureau_ data_list, consumer_bureau_ data, applicant_clear_flag, credit_limit, credit_score, account_balances, delinquency_ flag, quality_flags, and/or the like. A Links table 1219*f* may include fields such as, but not limited to: timestamp, link_ID, bidirectional_flag, transferor_ID, transferor_account_num, transferor_bank, transferor_branch, transferor_ABA, transferee_ID, transferee_account_num, transferee_bank, transferee_branch, transferee_ABA, and/or the like. A Schedules table 1219*g* may include fields such as, but not limited to: timestamp, transferor_ID, transferee_ID, link_ID, num_transfers transfer_date, transfer_frequency, transfer_interval, notify_transfers_settings, and/or the like. A Bank Accounts table 1219*h* may include fields such as, but not limited to: account_id, account_firstname, account_lastname, accountholder_type, account_type, contact_type, contact_info, opening_balance, current_balance, and/or the like. A Transfers table 1219*i* may include fields such as, but not limited to: transfer_ID, transferor_ID, transferee_ID, link_ID, transfer_amount, timestamp, notify_transfers_flags, and/or the like. An App Modules table 1219*j* may include fields such as, but not limited to: app_ID, app_name, app_type, OS_compatibilities_list, version, timestamp, developer_ID, and/or the like. A Market Data table 1219*k* may include fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe, Dun & Bradstreet, Reuter's Tib, Triarch, etc.), for example, through Microsoft's Active Template Library and Dealing Object Technology's real-time toolkit Rtt.Multi.

In one embodiment, the PAFT database may interact with other database systems. For example, employing a distributed database system, queries and data access by search PAFT component may treat the combination of the PAFT database, an integrated data security layer database as a single database entity.

In one embodiment, user programs may contain various user interface primitives, which may serve to update the PAFT. Also, various accounts may require custom database tables depending upon the environments and the types of clients the PAFT may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1219*a-k*. The PAFT may be configured to keep track of various settings, inputs, and parameters via database controllers.

The PAFT database may communicate to and/or with other components in a component collection, including itself, and/or facilities of the like. Most frequently, the PAFT database communicates with the PAFT component, other program components, and/or the like. The database may contain, retain, and provide information regarding other nodes and data.

The PAFTs

The PAFT component 1235 is a stored program component that is executed by a CPU. In one embodiment, the PAFT component incorporates any and/or all combinations of the aspects of the PAFT discussed in the previous figures. As such, the PAFT affects accessing, obtaining and the provision of information, services, transactions, and/or the like across various communications networks.

The PAFT component may transform prepaid account invitation requests via PAFT components into scheduled prepaid account transactions, and/or the like and use of the PAFT. In one embodiment, the PAFT component 1235 takes inputs (e.g., invitation request input 211, invitation template 216, invitation acceptance input 411, invitation type 416, prepaid account application form 419, application form input 423, applicant screening failure report 428*a*, applicant screening success report 428*b*, payment order input 611*a*, receivables request input 611*b*, transfer schedule 612*c*, transfer link data 615, user profile data 617, and/or the like) etc., and transforms the inputs via various components (e.g., PAM component 1241, PAR component 1242, Tr-FTT component 1243, Te-FTT component 1244, S-FTT component 1245, PA-FTP component 1246, and/or the like), into outputs (e.g., invitation data 218, customized prepaid account invitation 219, invitation confirmation message 222, prepaid account application form 420, application denial notification 429*a*, prepaid account opening request message 430*b*, account issue message 436, user profile 438, prepaid account link data 439, prepaid account funds transfer schedule 440, transaction data 622, transactions notifications 623*a-b*, and/or the like).

The PAFT component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the PAFT server employs a cryptographic server to encrypt and decrypt communications. The PAFT component may communicate to and/or with other components in a component collection, including itself, and/or facilities of the like. Most frequently, the PAFT component communicates with the PAFT database, operating systems, other program components, and/or the like. The PAFT may contain, communicate, generate, obtain, and/or provide program component, system, user, and/or data communications, requests, and/or responses.

Distributed PAFTs

The structure and/or operation of any of the PAFT node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the PAFT controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the PAFT controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An example listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
        $input = "";
        $input = socket_read($client, 1024);
        $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/Index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for PREPAID ACCOUNT FUNDS TRANSFER APPARATUSES, METHODS AND SYSTEMS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed inventions may be practiced. The advantages and features of the application are of a representative sample of embodiments only, and are not exhaustive and/or exclusive. They are presented only to assist in understanding and teach the claimed principles. It should be understood that they are not representative of all claimed inventions. As such, certain aspects of the disclosure have not been discussed herein. That alternate embodiments may not have been presented for a specific portion of the invention or that further undescribed alternate embodiments may be available for a portion is not to be considered a disclaimer of those alternate embodiments. It will be appreciated that many of those undescribed embodiments incorporate the same principles of the invention and others are equivalent. Thus, it is to be understood that other embodiments may be utilized and functional, logical, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the invention, and inapplicable to others. In addition, the disclosure includes other inventions not presently claimed. Applicant reserves all rights in those presently unclaimed inventions including the right to claim such inventions, file additional applications, continuations, continuations in part, divisions, and/or the like thereof. As such, it should be understood that advantages, embodiments, examples, functional, features, logical, organizational, structural, topological, and/or other aspects of the disclosure are not to be considered limitations on the disclosure as defined by the claims or limitations on equivalents to the claims. It is to be understood that, depending on the particular needs and/or characteristics of a PAFT individual and/or enterprise user, database configuration and/or relational model, data type, data transmission and/or network framework, syntax structure, and/or the like, various embodiments of the PAFT may be implemented that enable a great deal of flexibility and customization. For example, aspects of the PAFT may be adapted for credit cards, certificates of deposit (CDs), money market accounts, stock purchases, trading systems, mortgages, insurance policies, and/or the like. In general, it is contemplated that aspects of the PAFT may be adapted for any mode of transfer of wealth from one entity to another. While various embodiments and discussions of the PAFT have been directed to account-based transactions, however, it is to be understood that the embodiments described herein may be readily configured and/or customized for a wide variety of other applications and/or implementations.

What is claimed is:

1. A prepaid account funds transfer processor-implemented method for automatically scheduling a prepaid funds transfer based on a prepaid accounts receivable request, comprising:

receiving at a prepaid accounts receivable request server, via an electronic payment processing network, from a transferee user holding a transferee prepaid account, a prepaid account receivables request specifying i) a transferee user identifier and ii) a prepaid funds transfer amount to be transferred from a transferor prepaid account of the transferor user to the transferee prepaid account of the transferee user;

in response to receiving the prepaid account receivables request, retrieving, via the prepaid accounts receivable request server, a prepaid account link data record based on the received transferee user identifier from a links database, the prepaid link data record i) providing a link between the transferor prepaid account and the transferee prepaid account and ii) being generated at the time of creation of the transferee prepaid account;

determining, via the prepaid accounts receivable request server, using the retrieved prepaid account link data record, the transferor prepaid account that is linked with the transferee prepaid account; and generating, via the prepaid accounts receivable request server, a prepaid account funds transfer schedule record for storage in a schedules database, the prepaid account funds transfer schedule record indicating a date when the prepaid funds transfer amount of funds specified in the prepaid account receivables request are to be automatically transferred from the transferor prepaid account to the transferee prepaid account.

2. The method of claim 1, wherein creation of the transferee prepaid account is contingent upon the transferee user passing a screening test based on the completed prepaid account application.

3. The method of claim 1, wherein the transferee prepaid account is created locally.

4. The method of claim 1, further comprising:
transferring a scheduled transfer amount from the transferor prepaid account to the created transferee prepaid account based on the generated prepaid account funds transfer schedule.

5. The method of claim 4, wherein at least one scheduled funds transfer included in the prepaid account funds transfer schedule specifies transferring funds from the transferee prepaid account to the transferor prepaid account.

6. A prepaid account funds transfer system for automatically scheduling a prepaid funds transfer based on a prepaid accounts receivable request, comprising:
a prepaid accounts receivable request server that includes a memory and a processor communicatively coupled with the memory, the prepaid accounts receivable request server configured to:
receive at the prepaid accounts receivable request server, via an electronic payment processing network, from a transferee user holding a transferee prepaid account, a prepaid account receivables request specifying i) a transferee user identifier and ii) a prepaid funds transfer amount to be transferred from a transferor prepaid account of the transferor user to the transferee prepaid account of the transferee user;
in response to receiving the prepaid account receivables request, retrieve, via the prepaid accounts receivable request server, a prepaid account link data record based on the received transferee user identifier from a links database, the prepaid link data record i) providing a link between the transferor prepaid account and the transferee prepaid account and ii) being generated at the time of creation of the transferee prepaid account;
determine, via the prepaid accounts receivable request server, using the retrieved prepaid account link data record, the transferor prepaid account that is linked with the transferee prepaid account; and
generating via the prepaid accounts receivable request server, a prepaid account funds transfer schedule record for storage in a schedules database, the prepaid account funds transfer schedule record indicating a date when the prepaid funds transfer amount of funds specified in the prepaid account receivables request are to be automatically transferred from the transferor prepaid account to the created transferee prepaid account.

7. The system of claim 6, wherein creation of the transferee prepaid account depends on the transferee user passing a screening test based on the completed prepaid account application.

8. The system of claim 6, wherein the transferee prepaid account is created locally.

9. The system of claim 6, the prepaid accounts receivable request server further configured to:
transfer a scheduled transfer amount from the transferor prepaid account to the created transferee prepaid account according to the generated prepaid account funds transfer schedule.

10. The system of claim 9, wherein at least one scheduled funds transfer included in the prepaid account funds transfer schedule specifies transferring funds from the transferee prepaid account to the transferor prepaid account.

11. A tangible computer readable medium storing processor-issuable prepaid account funds transfer instructions to:
receive at the prepaid accounts receivable request server, via an electronic payment processing network, from a transferee user holding a transferee prepaid account, a prepaid account receivables request specifying i) a transferee user identifier and ii) a prepaid funds transfer amount to be transferred from a transferor prepaid account of the transferor user to the transferee prepaid account of the transferee user;
in response to receiving the prepaid account receivables request, retrieve, via the prepaid accounts receivable request server, a prepaid account link data record based on the received transferee user identifier from a links database, the prepaid link data record i) providing a link between the transferor prepaid account and the transferee prepaid account and ii) being generated at the time of creation of the transferee prepaid account;
determine, via the prepaid accounts receivable request server, using the retrieved prepaid account link data record, the transferor prepaid account that is linked with the transferee prepaid account; and
generating, via the prepaid accounts receivable request server, a prepaid account funds transfer schedule record for storage in a schedules database, the prepaid account funds transfer schedule record indicating a date when the prepaid funds transfer amount of funds specified in the prepaid account receivables request are to be automatically transferred from the transferor prepaid account to the created transferee prepaid account.

12. The medium of claim 11, wherein creation of the transferee prepaid account depends on the transferee user passing a screening test based on the completed prepaid account application.

13. The medium of claim 11, wherein the transferee prepaid account is created locally.

14. The medium of claim 11, further storing processing instructions to:
transfer a scheduled transfer amount from the transferor prepaid account to the created transferee prepaid account according to the generated prepaid account funds transfer schedule.

15. The medium of claim 14, wherein at least one scheduled funds transfer included in the prepaid account funds transfer schedule specifies transferring funds from the transferee prepaid account to the transferor prepaid account.

* * * * *